United States Patent
Izaki et al.

(10) Patent No.: US 9,623,579 B2
(45) Date of Patent: Apr. 18, 2017

(54) STRIP-SHAPED POLARIZING SHEET AND POLARIZING SHEET MATERIAL

(71) Applicant: NITTO DENKO CORPORATION, Ibaraki-shi, Osaka (JP)

(72) Inventors: Akinori Izaki, Ibaraki (JP); Yuu Sugimoto, Ibaraki (JP); Seiji Umemoto, Osaka (JP); Tetsushi Kunitake, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 357 days.

(21) Appl. No.: 14/295,005

(22) Filed: Jun. 3, 2014

(65) Prior Publication Data

US 2014/0287255 A1 Sep. 25, 2014

Related U.S. Application Data

(62) Division of application No. 13/202,730, filed as application No. PCT/JP2011/051884 on Jan. 31, 2011, now Pat. No. 8,805,565.

(30) Foreign Application Priority Data

Feb. 26, 2010 (JP) ................................ 2010-043250

(51) Int. Cl.
*G06F 19/00* (2011.01)
*B26D 5/02* (2006.01)
(Continued)

(52) U.S. Cl.
CPC ............ *B26D 5/02* (2013.01); *B32B 38/0004* (2013.01); *B32B 41/00* (2013.01); *G02B 5/3033* (2013.01);
(Continued)

(58) Field of Classification Search
CPC ....... B26D 5/02; B32B 38/0004; B32B 41/00; B32B 2457/20; B32B 2041/04; G02B 5/3033; Y10T 156/1077; Y10T 83/04
(Continued)

(56) References Cited

U.S. PATENT DOCUMENTS 4,211,132 A   7/1980  Nichols, III et al.
7,542,821 B2  6/2009  Floeder et al.
(Continued)

FOREIGN PATENT DOCUMENTS

CN     1259579 C     6/2006
CN   100491983 C     5/2009
(Continued)

OTHER PUBLICATIONS

Chinese Search Report dated May 8, 2014, issued in corresponding Application No. 201180001339.8, with English Translation.
(Continued)

*Primary Examiner* — Michael D Masinick
(74) *Attorney, Agent, or Firm* — Westerman, Hattori, Daniels & Adrian, LLP

(57) ABSTRACT

Provided are a cutting information determination method that can use a simpler process to improve yield, and a strip-shaped polarizing sheet manufacturing method using such a method, an optical display unit manufacturing method using such a method, a strip-shaped polarizing sheet, and a polarizing sheet material. A cutting position in the width direction A2, in which a polarizing sheet material MP is to be cut along its longitudinal direction A1, is determined based on the numbers of defects counted with respect to plural points in the width direction A2 of the polarizing sheet material MP. This makes it possible to determine the cutting position in such a way that a region with many defects does not fall within the cut width, so that a higher-yield cutting (Continued)

position can be determined. The cutting position can also be determined using a simple process in which defects are counted with respect to plural points in the width direction A2.

18 Claims, 10 Drawing Sheets

(51) Int. Cl.
  *B32B 38/00* (2006.01)
  *B32B 41/00* (2006.01)
  *G02B 5/30* (2006.01)
(52) U.S. Cl.
  CPC ....... *B32B 2041/04* (2013.01); *B32B 2457/20* (2013.01); *Y10T 156/1077* (2015.01)
(58) Field of Classification Search
  USPC .................................................. 700/109, 122
  See application file for complete search history.

(56) References Cited

U.S. PATENT DOCUMENTS

| 7,908,026 B2* | 3/2011 | Ohashi | ................. | G01N 21/958 |
| | | | | 700/121 |
| 8,290,609 B2 | 10/2012 | Ikeda et al. | | |
| 2008/0087149 A1* | 4/2008 | Ohashi | ................. | G01N 21/958 |
| | | | | 83/73 |
| 2009/0030544 A1 | 1/2009 | Floeder et al. | | |
| 2009/0159175 A1 | 6/2009 | Nakahira et al. | | |
| 2009/0280711 A1 | 11/2009 | Ikeda et al. | | |
| 2011/0005656 A1 | 1/2011 | Kitada et al. | | |
| 2011/0056357 A1 | 3/2011 | Ohashi | | |

FOREIGN PATENT DOCUMENTS

| JP | 2003-255132 A | 9/2003 |
| JP | 2005-114624 A | 4/2005 |
| JP | 2007-140046 A | 6/2007 |
| JP | 2008-116437 A | 5/2008 |
| JP | 2009-276750 A | 11/2009 |

OTHER PUBLICATIONS

Taiwanese Office Action dated Jan. 23, 2015, issued in corresponding TW Patent Application No. 100104816 with English translation (11 pages).
Notification of Transmittal of Translation of the International Preliminary Report on Patentabililty (Form PCT/IB/338) of International Application No. PCT/JP2011/051884 mailed Sep. 27, 2012 with Forms PCT/IB/373 and PCT/ISA/237.
International Search Report of PCT/JP2011/051884, date of mailing Apr. 12, 2011.
Office Action dated Nov. 15, 2016, issued in counterpart Korean Patent Application No. 10-2011-7015606, with English translation. (15 pages).

* cited by examiner

STRIP-SHAPED POLARIZING SHEET AND POLARIZING SHEET MATERIAL

CROSS-REFERENCE TO RELATED APPLICATIONS

This application is a Divisional of copending U.S. application Ser. No. 13/202,730 filed on Aug. 22, 2011, and wherein U.S. application Ser. No. 13/202,730 is a national stage application filed under 35 U.S.C. §371 of International Application No. PCT/JP2011/051884, filed on Jan. 31, 2011, which is based upon and claims priority under 35 U.S.C. §119(a) to Japan Patent Application No. 2010-043250 filed Feb. 26, 2010, the entire contents of which are hereby incorporated by reference.

TECHNICAL FIELD

The invention relates to a cutting information determination method for determining information about how to cut a polarizer-containing long polarizing sheet material along its longitudinal direction so that a long strip-shaped polarizing sheet with a predetermined cut width can be produced. The invention also relates to a strip-shaped polarizing sheet manufacturing method and an optical display unit manufacturing method, each using such a determination method, and to a strip-shaped polarizing sheet and a polarizing sheet material.

BACKGROUND ART

FIG. 10 is a flow chart showing a typical conventional method for manufacturing an optical display unit to be incorporated into an optical display device. First, an optical film manufacturer produces a polarizing sheet material roll, which is a roll of a long sheet material (#1). The sheet material is formed by bonding a release film to a long polarizing sheet material having a polarizer. The specific process of manufacturing such a polarizing sheet material roll is known, and therefore, a description thereof is omitted. The polarizing sheet material roll is then slit so that a strip-shaped polarizing sheet roll is formed with a width according to the shape of a display substrate (#2). The sheet material drawn from the strip-shaped polarizing sheet roll is then cut into pieces of a specific length according to the shape of the display substrate to be bonded (#3). Therefore, the strip-shaped polarizing sheet with the specific width is cut into polarizing sheet pieces, and a release film is bonded to each of the polarizing sheet pieces, so that pieces of sheet material are obtained. The pieces of sheet material with the specific cut length are subjected to an appearance inspection (#4). Examples of the inspection method include a visual defect inspection and an inspection using a known defect inspection apparatus. The finished products are then inspected (#5). The finished product inspection is based on criteria more stringent than those for the appearance inspection. Subsequently, each end face of the pieces of sheet material is worked (#6). The working is performed to prevent the pressure-sensitive adhesive from coming out of the end faces during transportation. The pieces of sheet material are then each subjected to clean packaging in a clean room environment (#7) and subjected to packaging for transportation (transport packaging) (#8). The pieces of sheet material manufactured as described above are transported to a panel processing manufacturer.

The panel processing manufacturer unpacks the pieces of sheet material transported (#11). An appearance inspection is then performed to check whether scratches, stains or other defects are produced during transportation or unpacking (#12). The pieces of sheet material determined to be non-defective in the inspection are then transferred to the next process. In some cases, this appearance inspection may be omitted. Display substrates (such as glass substrate units each with a sealed liquid crystal cell), to which the pieces of sheet material will be bonded, are previously manufactured and cleaned before the bonding process (#13).

The pieces of sheet material are then bonded to the display substrates, so that optical display units are formed (#14). In this process, a polarizing sheet piece is obtained by peeling off the release film from the piece of sheet material with the pressure-sensitive adhesive layer remaining thereon, and the polarizing sheet piece is bonded to one side of the display substrate using the surface of the pressure-sensitive adhesive layer as the bonding surface. Another polarizing sheet piece may also be bonded to the other side of the display substrate in the same manner. When polarizing sheet pieces are bonded to both sides of the display substrate, they may have the same structure or different structures. Subsequently, the optical display unit formed by bonding the polarizing sheet piece(s) to the display substrate is inspected for bonded state and defects (#15). The optical display unit determined to be non-defective in the inspection is transferred to a mounting process so that it is incorporated into an optical display device (#16). On the other hand, the optical display unit determined to be defective is subjected to a reworking process (#17). In the reworking process, the polarizing sheet piece is peeled off from the optical substrate, and a new polarizing sheet piece is bonded to the display substrate (#14).

The manufacturing process described above particularly requires the steps of working the end faces, packaging the piece of sheet material, and unpacking the piece of sheet material, because the optical film manufacturer and the panel processing manufacturer are located at different places. However, such a multi-step process has not only the problem of an increase in manufacturing cost but also the problem that pieces of sheet material are more likely to be scratched or stained during manufacture.

The technique disclosed in Japanese Patent Application Laid-Open (JP-A) No. 2007-140046 (Patent Document 1) provides a method for solving the problems, which includes the steps of cutting a strip-shaped sheet material being drawn from a strip-shaped polarizing sheet roll and bonding a cut piece of the sheet material to a display substrate, wherein the steps are manufactured on a continuous production line. This makes it possible to improve optical display unit productivity in contrast to the conventional process in which pieces of sheet material are individually packaged and delivered.

Patent Document 1 discloses a process including detecting defects in the sheet material drawn from the strip-shaped polarizing sheet roll and cutting the sheet material based on the result of the detection. More specifically, the sheet material drawn from the strip-shaped polarizing sheet roll is cut in a position depending on the position of the detected defect, and a cut piece of the sheet material is removed as a defective product when it contains a defect(s). Such a process makes it possible to improve the yield of the manufactured pieces of sheet material. In such a process, however, if the strip-shaped sheet material drawn from the strip-shaped polarizing sheet roll has many defects, many regions should be cut and removed from the sheet material. Therefore, the process of manufacturing a strip-shaped polarizing sheet roll by slitting a polarizing sheet material roll should preferably be performed in such a manner that the yield can be further improved.

On the other hand, JP-A No. 2008-116437 (Patent Document 2) discloses a process including detecting defects in a sheet material and analyzing the defect information, which is information about the detected defects, to calculate a yield according to criteria for determining whether the products are non-defective or defective.

PRIOR ART DOCUMENTS

Patent Documents

Patent Document 1: Japanese Patent Application Laid-Open (JP-A) No. 2007-140046
Patent Document 2: JP-A No. 2008-116437

SUMMARY OF THE INVENTION

Problems to be Solved by the Invention

If a yield is calculated using the technique disclosed in Patent Document 2 and if in what position and into what width a polarizing sheet material roll should be cut are determined based on the calculated yield, the yield of the pieces of sheet material actually produced can be further improved.

However, if there are plural candidates for a combination of in what position and into what width a polarizing sheet material roll should be cut, the yield must be calculated for each of these candidates for such a combination, which causes the problem that the process becomes complicated.

An object of the invention, which has been made in view of the above circumstances, is to provide a cutting information determination method that can use a simpler process to improve the yield, and to provide a strip-shaped polarizing sheet manufacturing method using such a determination method, an optical display unit manufacturing method using such a determination method, a strip-shaped polarizing sheet, and a polarizing sheet material.

Means for Solving the Problems

A cutting information determination method according to a first aspect of the present invention relates to a method for determining information about how to cut a polarizer-containing long polarizing sheet material along its longitudinal direction so that a long strip-shaped polarizing sheet with a predetermined cut width can be produced, comprising:

a defect detecting step comprising detecting information about the positions of defects in the polarizing sheet material;

a defect counting step comprising counting defects present in the longitudinal direction with respect to each of a plurality of points in a width direction perpendicular to the longitudinal direction, based on the information about the positions of the detected defects; and a cutting position determining step comprising determining a cutting position in the width direction, in which the polarizing sheet material is to be cut along the longitudinal direction, based on the counted numbers of defects with respect to the plurality of points.

According to this feature, the cutting position is determined in such a way that a region with many defects does not fall within the cut width, based on the numbers of defects counted with respect to plural points in the width direction, which makes it possible to determine a cutting position in which a higher yield can be obtained. The cutting position is determined using such a simple process in which defects are counted with respect to plural points in the width direction. Therefore, even when there are different combinations of candidates for the cutting position and the cut width with respect to the polarizing sheet material, the process can be made simpler than a process in which the yield is calculated for each of these combinations. Therefore, the yield can be improved by a simpler process.

The cutting information determination method according to a second aspect of the present invention relates to the method, wherein the strip-shaped polarizing sheet is to be formed by cutting into a predetermined width and is for use in forming a plurality of rectangular polarizing sheet pieces of a predetermined size by cutting it into a predetermined length along the longitudinal direction, the method further comprising a candidate extracting step comprising extracting a plurality of candidates for the cutting position, based on the counted numbers of defects with respect to the plurality of points, wherein in the cutting position determining step, the cutting position is determined from the plurality of extracted candidates for the cutting position, based on the information about the positions of defects present in the longitudinal direction within the cut width with respect to each cutting position candidate.

According to this feature, plural cutting position candidates are extracted, based on the counted numbers of defects with respect to plural points in the width direction, and therefore, a higher-yield cutting position can be determined from these candidates, based on the information about the positions of defects present in the longitudinal direction within the cut width which is predetermined for the cutting positions. Therefore, the cutting position is determined taking into account the information about the positions of defects not only in the width direction but also in the longitudinal direction, so that the cutting position can be determined more appropriately than when the cutting position is determined based on only the number of defects counted at plural points in the width direction. When the cutting position is determined taking into account the information about the positions of defects not only in the width direction but also in the longitudinal direction, the process becomes more complicated. In this case, however, plural cutting position candidates may be previously extracted, based on the number of defects counted at plural points in the width direction, and only these candidates may be subjected to the process based on the information about the positions of defects present in the longitudinal direction, so that the cutting position can be appropriately determined by a relatively simple process.

The cutting information determination method according to a third aspect of the present invention relates to the method, further comprising a yield calculating step comprising calculating the yield of polarizing sheet pieces of a predetermined size, which can be obtained by cutting in each cutting position candidate, based on the information about the positions of defects present in the longitudinal direction within the cut width with respect to each of the plurality of extracted candidates for the cutting position, wherein in the cutting position determining step, the cutting position is determined based on the calculated yield.

According to this feature, the yield of polarizing sheet pieces is calculated for each cutting position, based on the information about the positions of defects present in the longitudinal direction within the cut width predetermined for the plural cutting positions extracted as candidates, and therefore, the cutting position can be more appropriately determined based on the calculated yield. In other words, when the cutting is performed with the predetermined width, the number and positions of defects falling within the cut width vary with the cutting position, and the yield of polarizing sheet pieces also varies with it, but based on the calculated yield, a higher-yield cutting position can be determined.

A cutting information determination method according to a fourth aspect of the present invention relates to a method for determining information about how to cut a polarizer-containing long polarizing sheet material along its longitudinal direction so that a long strip-shaped polarizing sheet with a predetermined cut width can be produced, comprising:

a defect detecting step comprising detecting information about the positions of defects in the polarizing sheet material;

a defect counting step comprising counting defects present in the longitudinal direction with respect to each of a plurality of points in a width direction perpendicular to the longitudinal direction, based on the information about the positions of the detected defects; and a cut width determining step comprising determining a width into which the polarizing sheet material is to be cut along the longitudinal direction, based on the counted numbers of defects with respect to the plurality of points.

According to this feature, the cut width is determined in such a way that a region with many defects does not fall within the cut width, based on the numbers of defects counted with respect to plural points in the width direction, which makes it possible to determine a cut width with which a higher yield can be obtained. The cut width is determined using such a simple process in which defects are counted with respect to plural points in the width direction. Therefore, even when there are different combinations of candidates for the cutting position and the cut width with respect to the polarizing sheet material, the process can be made simpler than a process in which the yield is calculated for each of these combinations. Therefore, the yield can be improved by a simpler process.

The cutting information determination method according to a fifth aspect of the present invention relates to the method, wherein the strip-shaped polarizing sheet is to be formed by cutting into any desired width in a predetermined cutting position and is for use in forming a plurality of rectangular polarizing sheet pieces of any desired size by cutting it into a predetermined length along the longitudinal direction, the method further comprising a candidate extracting step comprising extracting a plurality of candidates for the cut width, based on the counted numbers of defects with respect to the plurality of points, wherein in the cutting position determining step, the cut width is determined from the plurality of extracted candidates for the cut width, based on the information about the positions of defects present in the longitudinal direction within each cut width candidate with respect to the predetermined cutting position.

According to this feature, plural cut width candidates are extracted, based on the counted numbers of defects with respect to plural points in the width direction, and therefore, a relatively-high-yield, larger cut width can be determined from these candidates, based on the information about the positions of defects present in the longitudinal direction within each cut width for the predetermined cutting position. Therefore, the cut width is determined taking into account the information about the positions of defects not only in the width direction but also in the longitudinal direction, so that the cut width can be determined more appropriately than when the cut width is determined based on only the number of defects counted at plural points in the width direction. When the cut width is determined taking into account the information about the positions of defects not only in the width direction but also in the longitudinal direction, the process becomes more complicated. In this case, however, plural cut width candidates may be previously extracted, based on the number of defects counted at plural points in the width direction, and only these candidates may be subjected to the process based on the information about the positions of defects present in the longitudinal direction, so that the cut width can be appropriately determined by a relatively simple process.

The cutting information determination method according to a sixth aspect of the present invention relates to the method, further comprising a yield calculating step comprising calculating the yield of polarizing sheet pieces of each size, which can be obtained by cutting into each width, based on the information about the positions of defects present in the longitudinal direction within each of the plurality of extracted candidates for the cut width with respect to the predetermined cutting position, wherein in the cutting position determining step, the cut width is determined based on the calculated yield and a coefficient for each size of the polarizing sheet piece.

According to this feature, the yield of polarizing sheet pieces is calculated for each cut width, based on the information about the positions of defects present in the longitudinal direction within each of plural cut width candidates extracted for the predetermined cutting position, and therefore, the cut width can be more appropriately determined based on the calculated yield and the coefficient for each of the sizes of polarizing sheet pieces. In other words, when the cutting is performed in the predetermined cutting position, the yield of polarizing sheet pieces decreases with increasing the cut width, but a larger cut width for a relatively high yield can be determined, based on the calculated yield and the coefficient for each of the sizes of polarizing sheet pieces.

A cutting information determination method according to a seventh aspect of the present invention relates to a method for determining information about how to cut a polarizer-containing long polarizing sheet material along its longitudinal direction so that a long strip-shaped polarizing sheet with a predetermined cut width can be produced, comprising:

a defect detecting step comprising detecting information about the positions of defects in the polarizing sheet material;

a defect counting step comprising counting defects present in the longitudinal direction with respect to each of a plurality of points in a width direction perpendicular to the longitudinal direction, based on the information about the positions of the detected defects; and a cutting information determining step comprising determining a cutting position in the width direction and a width, in which and into which the polarizing sheet material is to be cut along the longitudinal direction, based on the counted numbers of defects with respect to the plurality of points.

According to this feature, the cutting position and the cut width are determined in such a way that a region with many defects does not fall within the cut width, based on the numbers of defects counted with respect to plural points in the width direction, which makes it possible to determine a higher-yield cutting position and a higher-yield cut width. The cutting position and the cut width are determined using such a simple process in which defects are counted with respect to plural points in the width direction. Therefore, even when there are different combinations of candidates for the cutting position and the cut width with respect to the polarizing sheet material, the process can be made simpler than a process in which the yield is calculated for each of these combinations. Therefore, the yield can be improved by a simpler process.

The cutting information determination method according to an eighth aspect of the present invention relates to the method, wherein the strip-shaped polarizing sheet is to be formed by cutting into any desired width in any desired cutting position and is for use in forming a plurality of rectangular polarizing sheet pieces of any desired size by cutting it into a predetermined length along the longitudinal direction, the method further comprising a candidate extracting step comprising extracting a plurality of combination candidates for a combination of the cutting position and the cut width, based on the counted numbers of defects with respect to the plurality of points, wherein in the cutting information determining step, the cutting position and the cut width are determined from the plurality of extracted combination candidates, based on the information about the positions of defects present in the longitudinal direction within the cut width candidate with respect to the cutting position candidate corresponding to the cut width candidate.

According to this feature, plural combinations of candidates for the cutting position and the cut width are extracted, based on the counted numbers of defects with respect to plural points in the width direction, and therefore, a relatively-high-yield combination of a cutting position and a larger cut width can be determined from these candidates, based on the information about the positions of defects present in the longitudinal direction within each cut width for each cutting position. Therefore, the cutting position and the cut width are determined taking into account the information about the positions of defects not only in the width direction but also in the longitudinal direction, so that the cutting position and the cut width can be determined more appropriately than when the cutting position and the cut width are determined based on only the number of defects counted at plural points in the width direction. When the cutting position and the cut width are determined taking into account the information about the positions of defects not only in the width direction but also in the longitudinal direction, the process becomes more complicated. In this case, however, plural combinations of candidates for the cutting position and the cut width may be previously extracted, based on the number of defects counted at plural points in the width direction, and only these candidates may be subjected to the process based on the information about the positions of defects present in the longitudinal direction, so that the cutting position and the cut width can be appropriately determined by a relatively simple process.

The cutting information determination method according to a ninth aspect of the present invention relates to the method, further comprising a yield calculating step comprising calculating the yield of polarizing sheet pieces of each size, which can be obtained by cutting with each combination, based on the information about the positions of defects present in the longitudinal direction within the cut width for the cutting position corresponding to the plurality of extracted combination candidates, wherein in the cutting position determining step, the cutting position and the cut width are determined based on the calculated yield and a coefficient for each size of the polarizing sheet piece.

According to this feature, the yield of polarizing sheet pieces is calculated for each combination, based on the information about the positions of defects present in the longitudinal direction within the cut width for the cutting position corresponding to the plural combinations extracted as candidates, and therefore, the cutting position and the cut width can be more appropriately determined based on the calculated yield and the coefficient for each of the sizes of polarizing sheet pieces. In other words, when the cutting is performed in any desired cutting position and with any desired cut width, the number and positions of defects falling within the cut width vary with the combination, and the yield of polarizing sheet pieces also varies, but a larger cut width for a relatively high yield can be determined, based on the calculated yield and the coefficient for each of the sizes of polarizing sheet pieces.

A method for manufacturing a strip-shaped polarizing sheet according to a tenth aspect of the present invention relates to a method, comprising cutting a polarizing sheet material along its longitudinal direction based on cutting information determined by the cutting information determination method.

According to this feature, there is provided a strip-shaped polarizing sheet manufacturing method that can produce the same advantageous effect as the cutting information determination method.

A method for manufacturing an optical display unit according to an eleventh aspect of the present invention relates to a method for manufacturing an optical display unit by a process: comprising cutting a strip-shaped polarizing sheet along its width direction to form a plurality of rectangular polarizing sheet pieces, wherein the strip-shaped polarizing sheet is manufactured by the method according to claim 10; and bonding the polarizing sheet pieces to a display substrate to form an optical display unit, comprising:

a cutting step comprising cutting the strip-shaped polarizing sheet along the width direction based on the information about the positions of defects to form the polarizing sheet pieces; and a bonding step comprising bonding the polarizing sheet pieces to the display substrate.

According to this feature, there is provided an optical display unit manufacturing method that can produce the same advantageous effect as the cutting information determination method.

A strip-shaped polarizing sheet according to a twelfth aspect of the present invention relates to a strip-shaped polarizing sheet, comprising a product manufactured by the method for manufacturing a strip-shaped polarizing sheet and having the information about the positions of defects.

According to this feature, the strip-shaped polarizing sheet has the information about the positions of the defects detected in the cutting information determination method, and therefore, the yield can be effectively improved by cutting the strip-shaped polarizing sheet based on the defect position information.

A polarizing sheet material according to a thirteenth aspect of the present invention relates to a polarizing sheet material, having cutting information determined by the cutting information determination method.

According to this feature, the polarizing sheet material has the information about how to cut, which is determined by the cutting information determination method, and therefore, the yield can be effectively improved by cutting the polarizing sheet material based on the information about how to cut.

EMBODIMENTS FOR CARRYING OUT THE INVENTION

First Embodiment

Figure 1:
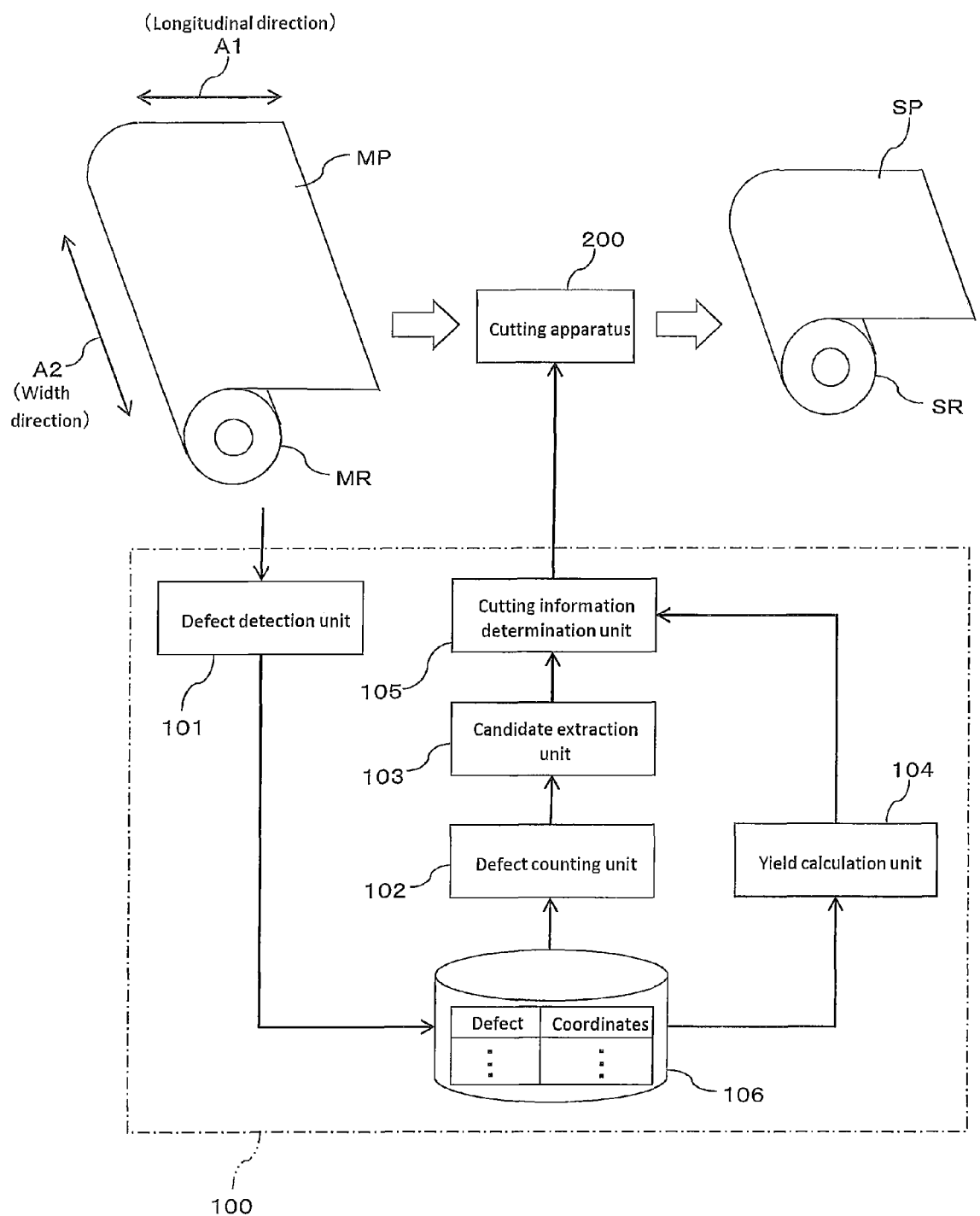
FIG. 1 is a block diagram illustrating an example of the system for manufacturing a strip-shaped polarizing sheet using a cutting information determination method according to a first embodiment of the invention.

FIG. 1 is a block diagram illustrating an example of the system for manufacturing a strip-shaped polarizing sheet using a cutting information determination method according to a first embodiment of the invention. The system for manufacturing a strip-shaped polarizing sheet is for manufacturing a long strip-shaped polarizing sheet SP with a predetermined cut width by cutting a long polarizing sheet material MP, which has a polarizer, along the longitudinal direction A1. The long polarizing sheet material MP is wound into a roll and provided in the form of a polarizing sheet material roll MR. The long strip-shaped polarizing sheet SP has a width narrower than that of the polarizing sheet material MP and is wound into a roll so that a strip-shaped polarizing sheet roll SR is manufactured.

The strip-shaped polarizing sheet SP is drawn from the strip-shaped polarizing sheet roll SR manufactured as mentioned above, and cut along the width direction A2 perpendicular to the longitudinal direction A1 so that a rectangular polarizing sheet piece can be formed. When the strip-shaped polarizing sheet SP is cut at predetermined intervals in the longitudinal direction A1, plural polarizing sheet pieces are formed, and the polarizing sheet pieces may each be bonded to a display substrate so that an optical display unit can be formed. For example, the cutting information determination method according to the invention is particularly suitable for use in the manufacture of optical display units applicable to optical display devices having a large screen with a size of 30 inches or more. Systems and methods for manufacturing optical display units are described later.

(System and Method for Manufacturing Strip-Shaped Polarizing Sheet)

The system for manufacturing the strip-shaped polarizing sheet SP includes: a cutting information determination apparatus 100 for determining information about how to cut the polarizing sheet material MP along the longitudinal direction A1; and a cutting apparatus 200 for cutting the polarizing sheet material MP based on the information about how to cut, which is determined by the cutting information determination apparatus 100.

For example, the cutting information determination apparatus 100 includes a computer, which includes a CPU, a memory, and so on. In the cutting information determination apparatus 100, the CPU executes computer programs so that the apparatus 100 can function as a defect detection unit 101, a defect counting unit 102, a candidate extraction unit 103, a yield calculation unit 104, and a cutting information determination unit 105 or the like. The cutting information determination apparatus 100 also includes a defect information storage unit 106 allocated to the memory.

The defect detection unit 101 detects information about the positions of defects in the polarizing sheet material MP. The method of detecting defects may be a method of applying light to the polarizing sheet material MP being drawn from the polarizing sheet material roll MR so that an image can be taken and processed. Known techniques may be used for the image processing algorithm, and for example, defects may be detected using gray-scale determination based on binarization. The information about the position of each detected defect is stored, in the defect information storage unit 106, as positional coordinates in the longitudinal direction A1 and the width direction A2 of the polarizing sheet material MP.

Based on the defect position information stored in the defect information storage unit 106, the defect counting unit 102 counts defects present in the longitudinal direction A1 with respect to each of plural points in the width direction A2. Specifically, plural points in the width direction A2 are each sequentially used as a mark point, and defects having the same coordinate in the width direction A2 as the mark point are read out of the defect information storage unit 106 and counted so that the number of defects present in the longitudinal direction A1 can be calculated with respect to each point. For example, the plural points are set at regular intervals along the width direction A2. The number of the points is generally 50 or more, preferably 100 or more, in particular, preferably from 200 to 300, in terms of improving accuracy.

In this embodiment, the width of the strip-shaped polarizing sheet SP, namely, the width into which the polarizing sheet material MP is to be cut, is predetermined. The polarizing sheet material MP is cut into the predetermined width to form the strip-shaped polarizing sheet SP, which is cut into the predetermined length along the longitudinal direction A1, so that plural rectangular polarizing sheet pieces of the predetermined size are formed. Even if the width into which the polarizing sheet material MP is to be cut is predetermined as mentioned above, the yield of the polarizing sheet pieces produced by cutting the strip-shaped polarizing sheet SP will vary with the cutting position in the width direction A2, because the number and positions of defects in the produced strip-shaped polarizing sheet SP will vary with the cutting position in the width direction A2.

The candidate extraction unit 103 extracts plural cutting position candidates, based on the counted numbers of defects with respect to the plural points in the width direction A2. Specifically, the counted numbers of defects with respect to all the points within the predetermined cut width are added for each cutting position, so that the number of all defects in the strip-shaped polarizing sheet SP with the predetermined cut width, which will be produced if the cutting is performed in each cutting position, is calculated. Subsequently, a predetermined number of high-class cutting positions, for each of which the number of defects calculated as described above is relatively small, are extracted as candidates.

Figure 2:
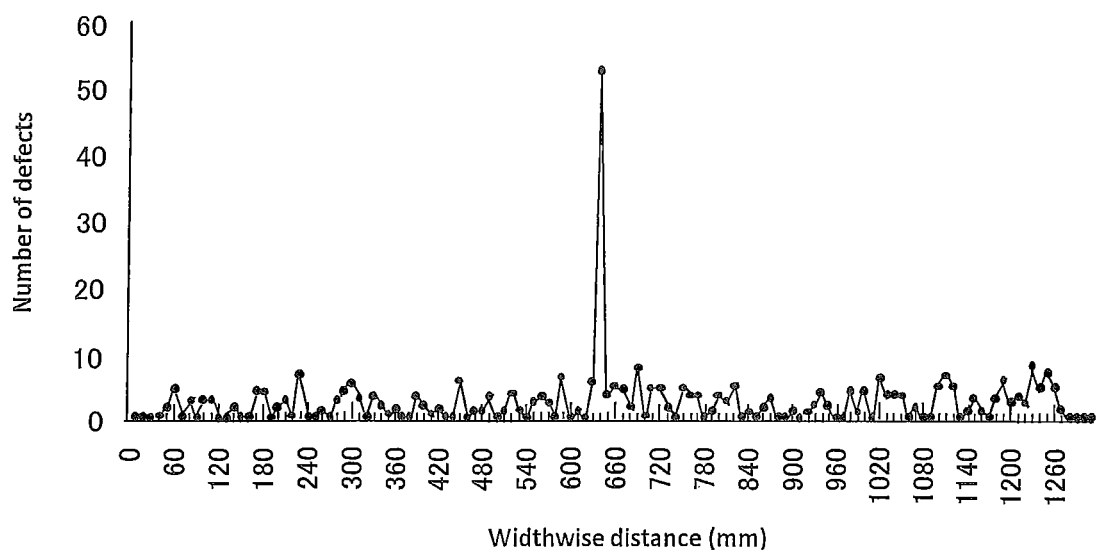
FIG. 2 is a graph showing an example of how many defects present in the longitudinal direction are counted with respect to plural points in the width direction, in which the horizontal axis represents the position in the width direction, and the vertical axis represents the number of defects.

FIG. 2 is a graph showing an example of how many defects present in the longitudinal direction A1 are counted with respect to plural points in the width direction A2, in which the horizontal axis represents the position in the width direction A2, and the vertical axis represents the number of defects. In this example, a point (peak) having a very large number of defects in the longitudinal direction A1 exists near the center of the strip-shaped polarizing sheet SP in the width direction A2. In such a case, cutting position candidates should be extracted so that the peak can be avoided, which makes it possible to improve the yield of the polarizing sheet pieces.

In the example shown in FIG. 2, the cutting was performed in such a position that the peak was avoided and in such a position that the peak fell within the cut width, and the yield of the actually produced polarizing sheet pieces was calculated in each case. The results are shown in Table 1 below.

TABLE 1

|  | Cutting position (mm) | Number of defects | Number of non-defective products | Yield (%) |
| --- | --- | --- | --- | --- |
| Peak-avoiding position | 120 | 179 | 305 | 69.3 |
| Peak-containing position | 660 | 246 | 285 | 64.7 |

As shown in Table 1, when the polarizing sheet material MP is cut in such a position that the peak falls within the cut width (in this example, a position 660 mm from the end in the width direction A2), the produced strip-shaped polarizing sheet SP has 246 defects, the number of defect-free polarizing sheet pieces (non-defective products) obtained by cutting the strip-shaped polarizing sheet SP is 285, and the yield is 64.7%. On the other hand, when the polarizing sheet material MP is cut in such a position that the peak does not fall within the cut width (in this example, a position 120 mm from the end in the width direction A2), the produced strip-shaped polarizing sheet SP has 179 defects, the number of non-defective products obtained by cutting the strip-shaped polarizing sheet SP is 305, and the yield is 69.3%. It is apparent that in this example, the yield of the actually produced polarizing sheet pieces is improved when the polarizing sheet material MP is cut in such a manner that the peak is avoided.

For example, the yield C of the polarizing sheet pieces may be calculated by the formula: C={(the area of non-defective products)/(the area of the strip-shaped polarizing sheet)}×100 or the formula: C={(the number of non-defective products)/(the maximum number of the polarizing sheet pieces obtained)}×100.

However, in some cases where the number of defects present in the longitudinal direction is relatively small with respect to each point near the peak point in the width direction A2, even if there is a peak as described above, the yield of polarizing sheet pieces can be improved by cutting in such a position that the peak falls within the cut width rather than by cutting in such a position that the peak is avoided.

Figure 3:
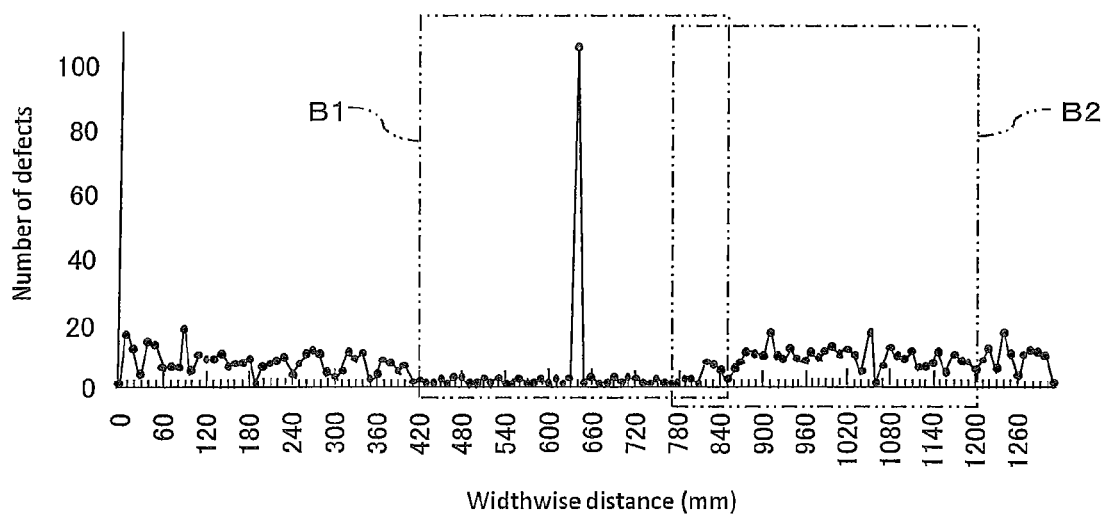
FIG. 3 is a graph showing another example of how many defects present in the longitudinal direction are counted with respect to plural points in the width direction, in which the horizontal axis represents the position in the width direction, and the vertical axis represents the number of defects.

FIG. 3 is a graph showing another example of how many defects present in the longitudinal direction A1 are counted with respect to plural points in the width direction A2, in which the horizontal axis represents the position in the width direction A2, and the vertical axis represents the number of defects. In this example, a point (peak) having a very large number of defects in the longitudinal direction A1 exists near the center of the strip-shaped polarizing sheet SP in the width direction A2, but the number of defects present in the longitudinal direction A1 is relatively small with respect to each point near the peak point. In such a case, for example, the total number of the counted defects with respect to all points within the cut width can be smaller when the cutting is performed in such a position that the peak falls within the cut width as indicated by the chain double-dashed line (B1) in FIG. 3 than when the cutting is performed in such a position that the peak is avoided (B2). As a result, in the former case, the number of defects in the produced strip-shaped polarizing sheet SP is reduced, so that the the yield of the polarizing sheet pieces is improved.

From these points of view, the candidate extraction unit 103 extracts plural cutting position candidates in the manner described above, so that cutting position candidates can be extracted, with which the yield of polarizing sheet pieces can be further improved. As long as a predetermined number of high-class cutting positions, for each of which the number of defects calculated within the cut width is relatively small, are extracted as the candidates, the candidate extraction unit 103 may use any of various processes such as a process of extracting, as candidates, a predetermined proportion of all cutting positions in order of increasing the number of defects, from the cutting position with the smallest number of defects first; a process of extracting, as candidates, only cutting positions for each of which the number of defects is less than a certain threshold; and a process of extracting, as candidates, only cutting positions for each of which the number of defects is less than a threshold that is obtained by multiplying the smallest number of defects by a certain coefficient.

The yield calculation unit 104 calculates the yield of polarizing sheet pieces obtained when the cutting is performed in each position, based on the information about the positions of defects present in the longitudinal direction A1 within the cut width with respect to each of the plural cutting positions extracted as the candidates. Specifically, the longitudinal direction A1 coordinates of the defects falling within the cut width are read for each cutting position, and a trial calculation is made of the yield of polarizing sheet pieces obtained by cutting the strip-shaped polarizing sheet SP along the width direction A2 at intervals selected in such a way that the defects can be avoided and in such a way that defect-free polarizing sheet pieces can be obtained as much as possible. As described above, the strip-shaped polarizing sheet SP may be cut at such irregular intervals that defects can be avoided (non-fixed-length cutting) rather than simply at regular intervals (fixed-length cutting), and in such a case, the yield of polarizing sheet pieces can be effectively improved.

Two strip-shaped polarizing sheet SP candidates were provided, and the yield of the actually produced polarizing sheet pieces was calculated when they were subjected to fixed-length cutting and when they were subjected to non-fixed-length cutting, respectively. The results are shown in Table 2 below.

TABLE 2

|  |  | Number of non-defective products | Yield (%) |
|---|---|---|---|
| Candidate 1 (Cutting position 0 mm) | Non-fixed-length cutting | 328 | 85.5 |
|  | Fixed-length cutting | 301 | 78.6 |
| Candidate 2 (Cutting position 630 mm) | Non-fixed-length cutting | 318 | 82.9 |
|  | Fixed-length cutting | 274 | 71.5 |

As shown in Table 2, when the strip-shaped polarizing sheet SP candidate 1 was subjected to fixed-length cutting, the number of the resulting defect-free polarizing sheet pieces (non-defective products) was 301, and the yield was 78.6%; when it was subjected to non-fixed-length cutting, the number of the resulting non-defective products was 328, and the yield was 85.5%, so that it was found that the yield increased by about 7%. When the strip-shaped polarizing sheet SP candidate 2 was subjected to fixed-length cutting, the number of the resulting non-defective products was 274, and the yield was 71.5%; when it was subjected to non-fixed-length cutting, the number of the resulting non-defective products was 318, and the yield was 82.9%, so that it was found that the yield increased by about 11%.

The cutting information determination unit 105 determines one cutting position from the plural cutting position candidates extracted by the candidate extraction unit 103. In this process, for example, the candidate for which the highest yield is calculated by the yield calculation unit 104 may be determined as the cutting position. The cutting position determined by the cutting information determination unit 105 is input into a cutting apparatus 200, and the cutting apparatus 200 cuts the polarizing sheet material MP in the input position, so that the strip-shaped polarizing sheet SP is produced. For example, the cutting apparatus 200 includes a laser device or a cutter.

Figure 4:
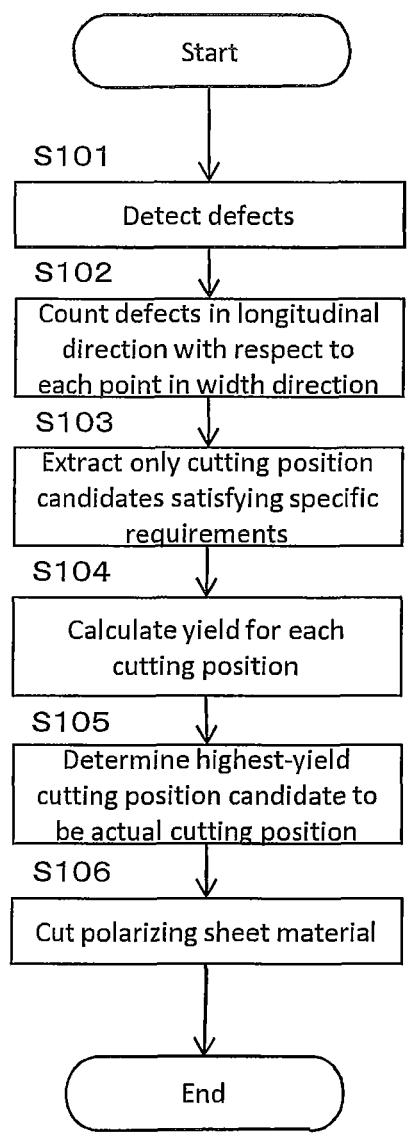
FIG. 4 is a flow chart showing an example of the process of manufacturing a strip-shaped polarizing sheet by cutting a polarizing sheet material.

FIG. 4 is a flow chart showing an example of the process of manufacturing the strip-shaped polarizing sheet SP by cutting the polarizing sheet material MP. In the process of manufacturing the strip-shaped polarizing sheet SP, information about the positions of defects in the polarizing sheet material MP is first detected (Step S101: the defect detecting step), and the information about the position of each detected defect is stored, in the defect information storage unit 106, as positional coordinates in the longitudinal direction A1 and the width direction A2 of the polarizing sheet material MP.

Subsequently, based on the defect position information stored in the defect information storage unit 106, defects present in the longitudinal direction A1 are counted with respect to each of plural points in the width direction A2 (Step S102: the defect counting step). Based on the counted numbers of defects with respect to the plural points in the width direction A2, only cutting positions that satisfy specific requirements are extracted as candidates (Step S103: the candidate extracting step). The cutting positions that satisfy specific requirements correspond to a predetermined number of high-class cutting positions, for each of which the number of defects calculated within the cut width is relatively small as described above.

As for the plural cutting position candidates extracted as described above, the yield of polarizing sheet pieces, which can be obtained by cutting in each cutting position, is calculated based on the information about the positions of defects present in the longitudinal direction A1 within the cut width for each cutting position (Step S104: the yield calculating step). Subsequently, the candidate for which the calculated yield is highest is determined to be an actual cutting position (Step 105: the cutting position determining step), and the polarizing sheet material MP is cut in the determined position so that the strip-shaped polarizing sheet SP is produced (Step S106: the cutting step).

In this embodiment, the cutting position is determined in such a way that a region with many defects does not fall within the cut width, based on the numbers of defects counted with respect to plural points in the width direction A2, which makes it possible to determine a cutting position in which a higher yield can be obtained. The cutting position is determined using such a simple process in which defects are counted with respect to plural points in the width direction A2. Therefore, even when there are different combinations of candidates for the cutting position and the cut width with respect to the polarizing sheet material MP, the process can be made simpler than a process in which the yield is calculated for each of these combinations. Therefore, the yield can be improved by a simpler process.

Particularly in this embodiment, plural cutting position candidates are extracted, based on the counted numbers of defects with respect to plural points in the width direction A2, and therefore, a higher-yield cutting position can be determined from these candidates, based on the information about the positions of defects present in the longitudinal direction A1 within the cut width which is predetermined for the cutting positions. Therefore, the cutting position is determined taking into account the information about the positions of defects not only in the width direction A2 but also in the longitudinal direction A1, so that the cutting position can be determined more appropriately than when the cutting position is determined based on only the number of defects counted at plural points in the width direction A2. When the cutting position is determined taking into account the information about the positions of defects not only in the width direction A2 but also in the longitudinal direction A1, the process becomes more complicated. In this case, however, plural cutting position candidates may be previously extracted, based on the number of defects counted at plural points in the width direction A2, and only these candidates may be subjected to the process based on the information about the positions of defects present in the longitudinal direction A1, so that the cutting position can be appropriately determined by a relatively simple process.

Also in this embodiment, the yield of polarizing sheet pieces is calculated for each cutting position, based on the information about the positions of defects present in the longitudinal direction A1 within the cut width predetermined for the plural cutting positions extracted as candidates, and therefore, the cutting position can be more appropriately determined based on the calculated yield. In other words, when the cutting is performed with the predetermined width, the number and positions of defects falling within the cut width vary with the cutting position, and the yield of polarizing sheet pieces also varies with it, but based on the calculated yield, a higher-yield cutting position can be determined.

However, the processes performed by the candidate extraction unit 103 and the yield calculation unit 104 may be omitted, and the cutting position may be determined based on only the number of defects counted by the defect counting unit 102 with respect to the plural points in the width direction A2. In such a case, the yield of polarizing sheet pieces may be lower than that obtained when the candidate extraction unit 103 and the yield calculation unit 104 are used to perform the processes, but as illustrated using FIGS. 2 and 3, the yield of polarizing sheet pieces can be improved, as compared with when the polarizing sheet material MP is cut in such a position that a region with many defects falls within the cut width.

Second Embodiment

In the first embodiment, a description is given of a case where the width of the strip-shaped polarizing sheet SP, namely, the width into which the polarizing sheet material MP is to be cut, is predetermined. This embodiment is different from such a case in that one of the cutting positions is predetermined in the polarizing sheet material MP, and the polarizing sheet material MP is cut into any desired width with respect to the cutting position, when the strip-shaped polarizing sheet SP is produced.

Figure 5:
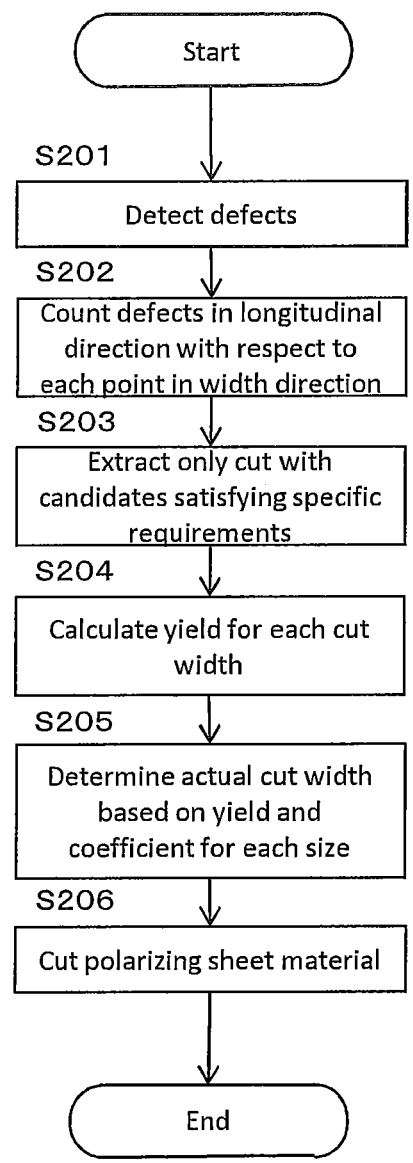
FIG. 5 is a flow chart showing an example of the process of manufacturing a strip-shaped polarizing sheet by cutting a polarizing sheet material using a cutting information determination method according to a second embodiment of the invention.

FIG. 5 is a flow chart showing an example of the process of manufacturing the strip-shaped polarizing sheet SP by cutting the polarizing sheet material MP using a cutting information determination method according to a second embodiment of the invention. In the process of manufacturing the strip-shaped polarizing sheet SP, information about the positions of defects in the polarizing sheet material MP is first detected (Step S201: the defect detecting step), and the information about the position of each detected defect is stored, in the defect information storage unit 106, as positional coordinates in the longitudinal direction A1 and the width direction A2 of the polarizing sheet material MP.

Subsequently, based on the defect position information stored in the defect information storage unit 106, defects present in the longitudinal direction A1 are counted with respect to each of plural points in the width direction A2 (Step S202: the defect counting step). Based on the counted numbers of defects with respect to the plural points in the width direction A2, only cut widths that satisfy specific requirements are extracted as candidates (Step S203: the candidate extracting step). The cut widths that satisfy specific requirements correspond to a predetermined number of high-class cut widths, for each of which the number of defects calculated within the cut width is relatively small. The candidates may be extracted using any of various processes such as a process of extracting, as candidates, a predetermined proportion of all cut widths in order of increasing the number of defects, from the cut width with the smallest number of defects first; a process of extracting, as candidates, only cut widths for each of which the number of defects is less than a certain threshold; and a process of extracting, as candidates, only cut widths for each of which the number of defects is less than a threshold that is obtained by multiplying the smallest number of defects by a certain coefficient.

As for the plural cut width candidates extracted as described above, the yield of polarizing sheet pieces of each size, which can be obtained by cutting into each width, is calculated based on the information about the positions of defects present in the longitudinal direction A1 within each cut width for the predetermined cutting position (Step S204: the yield calculating step).

When the cut width of the strip-shaped polarizing sheet SP is freely determined as in this embodiment, the size of the polarizing sheet piece produced by cutting the strip-shaped polarizing sheet SP varies with the cut width, and the interval in the longitudinal direction A1 also varies, which corresponds to the cut width in the process of cutting the strip-shaped polarizing sheet SP along the width direction. When polarizing sheet pieces of different sizes are manufactured, the yield increases with decreasing the size of the polarizing sheet pieces, or decreases with increasing the size of the polarizing sheet pieces. Therefore, if the highest-yield candidate is simply determined to be an actual cut width, it will result in a cut width suitable for polarizing sheet pieces of a smaller size, namely, it will result in a smaller cut width.

In this embodiment, therefore, the calculated yield of polarizing sheet pieces of each size is multiplied by a coefficient for each size, and the resulting values are compared, when the actual cut width is determined from the plural candidates. Specifically, the calculated yield of polarizing sheet pieces of each size is multiplied by a coefficient that increases with increasing the size, such as the size (inch) of them or the area ($mm^2$) corresponding to the size. Subsequently, the candidate with the largest value among the values obtained by the calculation is determined to be an actual cut width (Step S205: the cut width determining step), and the polarizing sheet material MP is cut into the determined width so that the strip-shaped polarizing sheet SP is produced (Step S206: the cutting step).

In this embodiment, the cut width is determined in such a way that a region with many defects does not fall within the cut width, based on the numbers of defects counted with respect to plural points in the width direction A2, which makes it possible to determine a cut width with which a higher yield can be obtained. The cut width is determined using such a simple process in which defects are counted with respect to plural points in the width direction A2. Therefore, even when there are different combinations of candidates for the cutting position and the cut width with respect to the polarizing sheet material MP, the process can be made simpler than a process in which the yield is calculated for each of these combinations. Therefore, the yield can be improved by a simpler process.

Particularly in this embodiment, plural cut width candidates are extracted, based on the counted numbers of defects with respect to plural points in the width direction A2, and therefore, a relatively-high-yield, larger cut width can be determined from these candidates, based on the information about the positions of defects present in the longitudinal direction A1 within each cut width for the predetermined cutting position. Therefore, the cut width is determined taking into account the information about the positions of defects not only in the width direction A2 but also in the longitudinal direction A1, so that the cut width can be determined more appropriately than when the cut width is determined based on only the number of defects counted at plural points in the width direction A2. When the cut width is determined taking into account the information about the positions of defects not only in the width direction A2 but also in the longitudinal direction A1, the process becomes more complicated. In this case, however, plural cut width candidates may be previously extracted, based on the number of defects counted at plural points in the width direction A2, and only these candidates may be subjected to the process based on the information about the positions of defects present in the longitudinal direction A1, so that the cut width can be appropriately determined by a relatively simple process.

Also in this embodiment, the yield of polarizing sheet pieces is calculated for each cut width, based on the information about the positions of defects present in the longitudinal direction A1 within each of plural cut width candidates extracted for the predetermined cutting position, and therefore, the cut width can be more appropriately determined based on the calculated yield and the coefficient for each of the sizes of polarizing sheet pieces. In other words, when the cutting is performed in the predetermined cutting position, the yield of polarizing sheet pieces decreases with increasing the cut width, but a larger cut width for a relatively high yield can be determined, based on the calculated yield and the coefficient for each of the sizes of polarizing sheet pieces.

However, the processes performed by the candidate extraction unit 103 and the yield calculation unit 104 may be omitted, and the cut width may be determined based on only the number of defects counted by the defect counting unit 102 with respect to the plural points in the width direction A2. In such a case, the yield of polarizing sheet pieces may be lower than that obtained when the candidate extraction unit 103 and the yield calculation unit 104 are used to perform the processes, but as in the first embodiment, the yield of polarizing sheet pieces can be improved, as compared with when the polarizing sheet material MP is cut into such a width that a region with many defects falls within the cut width.

Third Embodiment

In the first and second embodiments, a description is given of a case where the cutting position or the cut width is predetermined for the polarizing sheet material MP. This embodiment is different from such a case in that neither the cutting position nor the cut width is predetermined for the polarizing sheet material MP, and the strip-shaped polarizing sheet SP is manufactured by cutting the polarizing sheet material MP in any desired cutting position and into any desired cut width.

Figure 6:
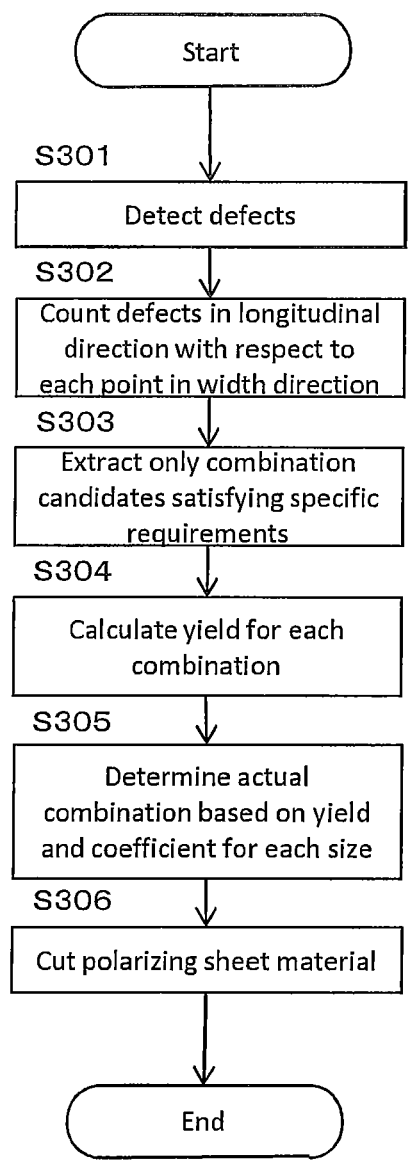
FIG. 6 is a flow chart showing an example of the process of manufacturing a strip-shaped polarizing sheet by cutting a polarizing sheet material using a cutting information determination method according to a third embodiment of the invention.

FIG. 6 is a flow chart showing an example of the process of manufacturing the strip-shaped polarizing sheet SP by cutting the polarizing sheet material MP using a cutting information determination method according to a third embodiment of the invention. In the process of manufacturing the strip-shaped polarizing sheet SP, information about the positions of defects in the polarizing sheet material MP is first detected (Step S301: the defect detecting step), and the information about the position of each detected defect is stored, in the defect information storage unit 106, as positional coordinates in the longitudinal direction A1 and the width direction A2 of the polarizing sheet material MP.

Subsequently, based on the defect position information stored in the defect information storage unit 106, defects present in the longitudinal direction A1 are counted with respect to each of plural points in the width direction A2 (Step S302: the defect counting step). Based on the counted numbers of defects with respect to the plural points in the width direction A2, only combinations of cutting positions and cut widths, which satisfy specific requirements, are extracted as candidates (Step S303: the candidate extracting step). The combinations of cutting positions and cut widths, which satisfy specific requirements, correspond to a predetermined number of high-class combinations, for each of which the number of defects calculated within the cut width is relatively small. The candidates may be extracted using any of various processes such as a process of extracting, as candidates, a predetermined proportion of all combinations in order of increasing the number of defects, from a combination with the smallest number of defects first; a process of extracting, as candidates, only combinations for each of which the number of defects is less than a certain threshold; and a process of extracting, as candidates, only combinations for each of which the number of defects is less than a threshold that is obtained by multiplying the smallest number of defects by a certain coefficient.

As for the plural combination candidates extracted as described above, the yield of polarizing sheet pieces of each size, which can be obtained by cutting into each width, is calculated based on the information about the positions of defects present in the longitudinal direction A1 within the cut width for the cutting position corresponding thereto (Step S304: the yield calculating step).

When the cut width of the strip-shaped polarizing sheet SP is freely determined as in this embodiment, the size of the polarizing sheet piece produced by cutting the strip-shaped polarizing sheet SP varies with the cut width, and the interval in the longitudinal direction A1 also varies, which corresponds to the cut width in the process of cutting the strip-shaped polarizing sheet SP along the width direction. When polarizing sheet pieces of different sizes are manufactured, the yield increases with decreasing the size of the polarizing sheet pieces, or decreases with increasing the size of the polarizing sheet pieces. Therefore, if the highest-yield candidate is simply determined to be a combination of an actual cutting position and an actual cut width, it will result in a combination suitable for polarizing sheet pieces of a smaller size.

In this embodiment, therefore, the calculated yield of polarizing sheet pieces of each size is multiplied by a coefficient for each size, and the resulting values are compared, when a combination of an actual cutting position and an actual cut width is determined from the plural candidates. Specifically, the calculated yield of polarizing sheet pieces of each size is multiplied by a coefficient that increases with increasing the size, such as the size (inch) of them or the area ($mm^2$) corresponding to the size. Subsequently, the candidate with the largest value among the values obtained by the calculation is determined to be a combination of an actual cutting position and an actual cut width (Step S305: the cutting information determination step), and the polarizing sheet material MP is cut in the determined position and into the determined width so that the strip-shaped polarizing sheet SP is produced (Step S306: the cutting step).

In this embodiment, the cutting position and the cut width are determined in such a way that a region with many defects does not fall within the cut width, based on the numbers of defects counted with respect to plural points in the width direction A2, which makes it possible to determine a higher-yield cutting position and a higher-yield cut width. The cutting position and the cut width are determined using such a simple process in which defects are counted with respect to plural points in the width direction A2. Therefore, even when there are different combinations of candidates for the cutting position and the cut width with respect to the polarizing sheet material MP, the process can be made simpler than a process in which the yield is calculated for each of these combinations. Therefore, the yield can be improved by a simpler process.

Particularly in this embodiment, plural combinations of candidates for the cutting position and the cut width are extracted, based on the counted numbers of defects with respect to plural points in the width direction A2, and therefore, a relatively-high-yield combination of a cutting position and a larger cut width can be determined from these candidates, based on the information about the positions of defects present in the longitudinal direction A1 within the cut width for the cutting position corresponding thereto. Therefore, the cutting position and the cut width are determined taking into account the information about the positions of defects not only in the width direction A2 but also in the longitudinal direction A1, so that the cutting position and the cut width can be determined more appropriately than when the cutting position and the cut width are determined based on only the number of defects counted at plural points in the width direction A2. When the cutting position and the cut width are determined taking into account the information about the positions of defects not only in the width direction A2 but also in the longitudinal direction A1, the process becomes more complicated. In this case, however, plural combinations of candidates for the cutting position and the cut width may be previously extracted, based on the number of defects counted at plural points in the width direction A2, and only these candidates may be subjected to the process based on the information about the positions of defects present in the longitudinal direction A1, so that the cutting position and the cut width can be appropriately determined by a relatively simple process.

Also in this embodiment, the yield of polarizing sheet pieces is calculated for each combination, based on the information about the positions of defects present in the longitudinal direction A1 within the cut width for the cutting position corresponding to the plural combinations extracted as candidates, and therefore, the cutting position and the cut width can be more appropriately determined based on the calculated yield and the coefficient for each of the sizes of polarizing sheet pieces. In other words, when the cutting is performed in any desired cutting position and into any desired cut width, the number and positions of defects falling within the cut width vary with the combination, and the yield of polarizing sheet pieces also varies, but a larger cut width for a relatively high yield can be determined, based on the calculated yield and the coefficient for each of the sizes of polarizing sheet pieces.

However, the processes performed by the candidate extraction unit 103 and the yield calculation unit 104 may be omitted, and the cutting position and the cut width may be determined based on only the number of defects counted by the defect counting unit 102 with respect to the plural points in the width direction A2. In such a case, the yield of polarizing sheet pieces may be lower than that obtained when the candidate extraction unit 103 and the yield calculation unit 104 are used to perform the processes, but as in the first embodiment, the yield of polarizing sheet pieces can be improved, as compared with when the polarizing sheet material MP is cut into such a width that a region with many defects falls within the cut width.

The defect position information detected by the cutting information determination method as described in the first to third embodiments, namely, the defect position information stored in the defect information storage unit 106 may be supplied together with the produced strip-shaped polarizing sheet SP to a system for manufacturing an optical display unit. In this case, the defect position information may be held as coded information (such as QR codes or bar codes) on the strip-shaped polarizing sheet SP when supplied, or may be supplied separately from the strip-shaped polarizing sheet SP. Therefore, when the positional information about the detected defects is supplied together with the strip-shaped polarizing sheet SP, the strip-shaped polarizing sheet SP can be cut based on the defect position information, so that the yield can be effectively improved.

In the first to third embodiments, a description is given of a case where the polarizing sheet material MP is cut based on the determined information about how to cut the polarizing sheet material MP. However, such a feature is non-limiting, and alternatively, the determined cutting information may be supplied together with the polarizing sheet material MP to a system for manufacturing a strip-shaped polarizing sheet SP. In this case, the determined cutting information may be held as coded information (such as QR codes or bar codes) on the polarizing sheet material MP when supplied, or may be supplied separately from the polarizing sheet material MP. Therefore, when the determined cutting information is supplied together with the polarizing sheet material MP, the polarizing sheet material MP can be cut based on the cutting information, so that the yield can be effectively improved.

Figure 7:
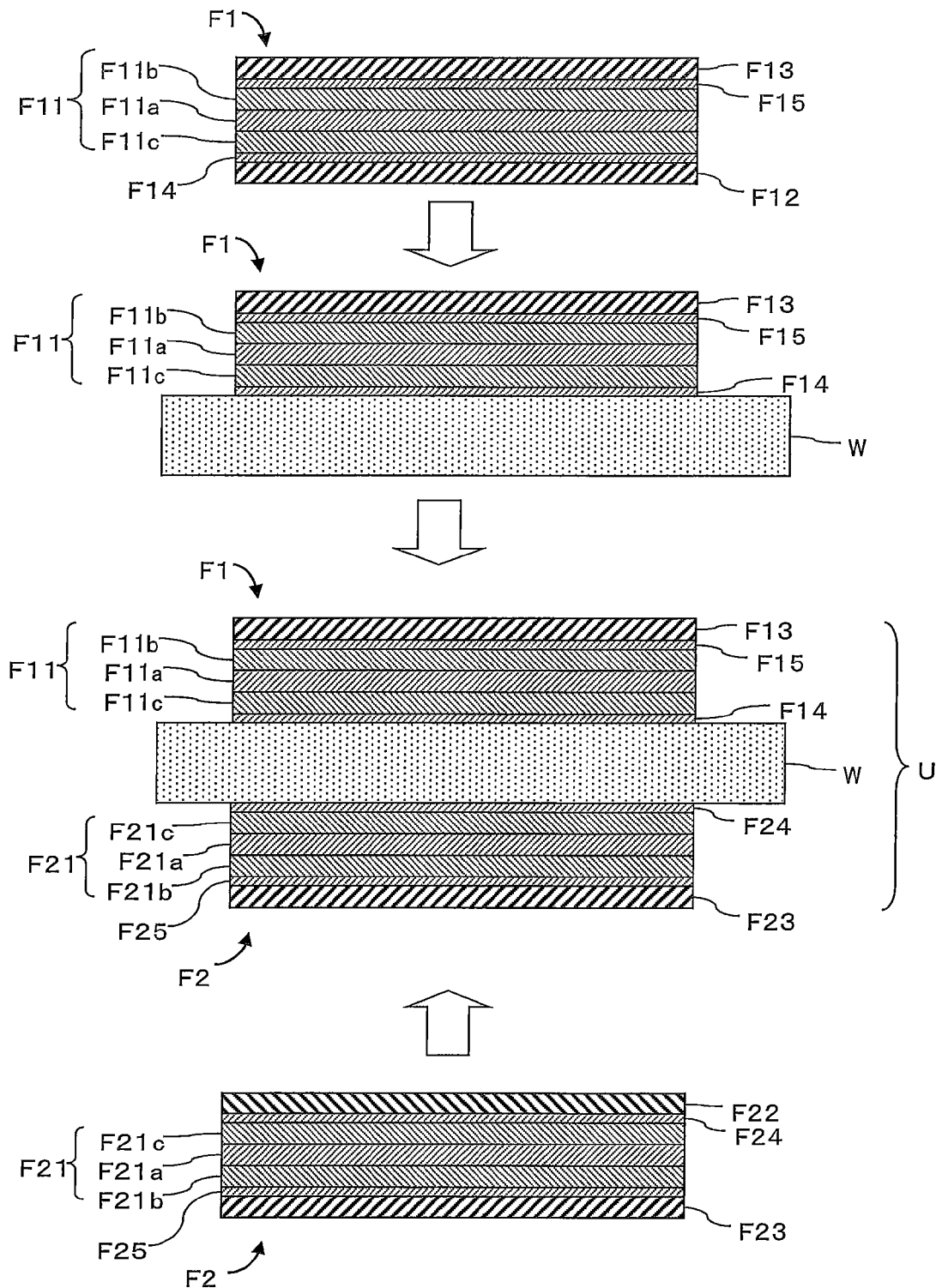
FIG. 7 is a schematic cross-sectional view showing the process of manufacturing an optical display unit by bonding polarizing sheet pieces to a display substrate.

FIG. 7 is a schematic cross-sectional view showing the process of manufacturing an optical display unit U by bonding polarizing sheet pieces F1 and F2 to a display substrate W. Hereinafter, a description is given of an example of the method and system for manufacturing an optical display unit U.

In this embodiment, the optical display unit U is manufactured by a process including bonding a first polarizing sheet piece F1 to one surface (first surface) of a display substrate W, wherein the first sheet piece F1 is formed by cutting a first strip-shaped polarizing sheet drawn from a first strip-shaped polarizing sheet roll, and bonding a second polarizing sheet piece F2 to the other surface (second surface) of the display substrate W, wherein the second sheet piece F2 is formed by cutting a second strip-shaped polarizing sheet drawn from a second strip-shaped polarizing sheet roll. It will be understood that this process is non-limiting, and alternatively, a polarizing sheet piece may be bonded to only one surface of the display substrate W.

(Display Substrate)

Examples of the display substrate W include a glass substrate unit for a liquid crystal cell and an organic electroluminescent (EL) light-emitting unit. The display substrate W typically has a rectangular shape.

(Polarizing Sheet Pieces)

For example, the polarizing sheet pieces F1 and F2 may each be a polarizing film or a laminated film including a combination of the polarizing film and a retardation film or a brightness enhancement film. The polarizing sheet pieces F1 and F2 have pressure-sensitive adhesive layers F14 and F24, respectively, on one side to form bonding surfaces for the display substrate W, and release films F12 and F22 are bonded to the pressure-sensitive adhesive layers F14 and F24, respectively.

Specifically, the first strip-shaped polarizing sheet roll is formed by winding a laminate including: the first strip-shaped polarizing sheet having the first pressure-sensitive adhesive layer F14 on one side; and the release film F12 bonded to the first pressure-sensitive adhesive layer 14, and the first polarizing sheet piece F1 is formed by cutting the first strip-shaped polarizing sheet drawn from the first strip-shaped polarizing sheet roll. Similarly, the second strip-shaped polarizing sheet roll is formed by winding a laminate including: the second strip-shaped polarizing sheet having the second pressure-sensitive adhesive layer F24 on one side; and the release film F22 bonded to the second pressure-sensitive adhesive layer F24, and the second polarizing sheet piece F2 is formed by cutting the second strip-shaped polarizing sheet drawn from the second strip-shaped polarizing sheet roll.

In this example, the first strip-shaped polarizing sheet and the first polarizing sheet piece F1 each have a first optical film F11 and a first surface-protecting film F13. For example, the first optical film F11 includes a first polarizer F11a, a first film F11b bonded to one side thereof, and a second film F11c bonded to the other side.

For example, the first film F11b and the second film F11c each include a polarizer protecting film (such as a triacetylcellulose film or a PET film). The second film F11c is bonded to the display substrate W with the first pressure-sensitive adhesive layer F14 interposed therebetween. The first film F11b may be subjected to a surface treatment such as an anti-reflection treatment. The first surface-protecting film F13 is bonded to the first film F11b with the pressure-sensitive adhesive layer F15 interposed therebetween.

It will be understood that such a structure is non-limiting, and for example, the first surface-protecting film F13 and the pressure-sensitive adhesive layer F15 may be omitted from the structure, or any other film than the first surface-protecting film F13 may be bonded to the first optical film F11 in the structure. At least one of the first and second films F11b and F11c may also be omitted.

Similarly, the second strip-shaped polarizing sheet and the second polarizing sheet piece F2 each have a second optical film F21 and a second surface-protecting film F23. For example, the second optical film F21 includes a second polarizer F21a, a third film F21b bonded to one side thereof, and a fourth film F21c bonded to the other side.

For example, the third film F21b and the fourth film F21c each include a polarizer protecting film (such as a triacetylcellulose film or a PET film). The fourth film F21c is bonded to the display substrate W with the second pressure-sensitive adhesive layer F24 interposed therebetween. The third film F21b may be subjected to a surface treatment such as an anti-reflection treatment. The second surface-protecting film F23 is bonded to the third film F21b with the pressure-sensitive adhesive layer F25 interposed therebetween.

It will be understood that such a structure is non-limiting, and for example, the second surface-protecting film F23 and the pressure-sensitive adhesive layer F25 may be omitted from the structure, or any other film than the second surface-protecting film F23 may be bonded to the second optical film F21 in the structure. At least one of the third and fourth films F21b and F21c may also be omitted.

(System and Method for Manufacturing Optical Display Unit)

Figure 8:
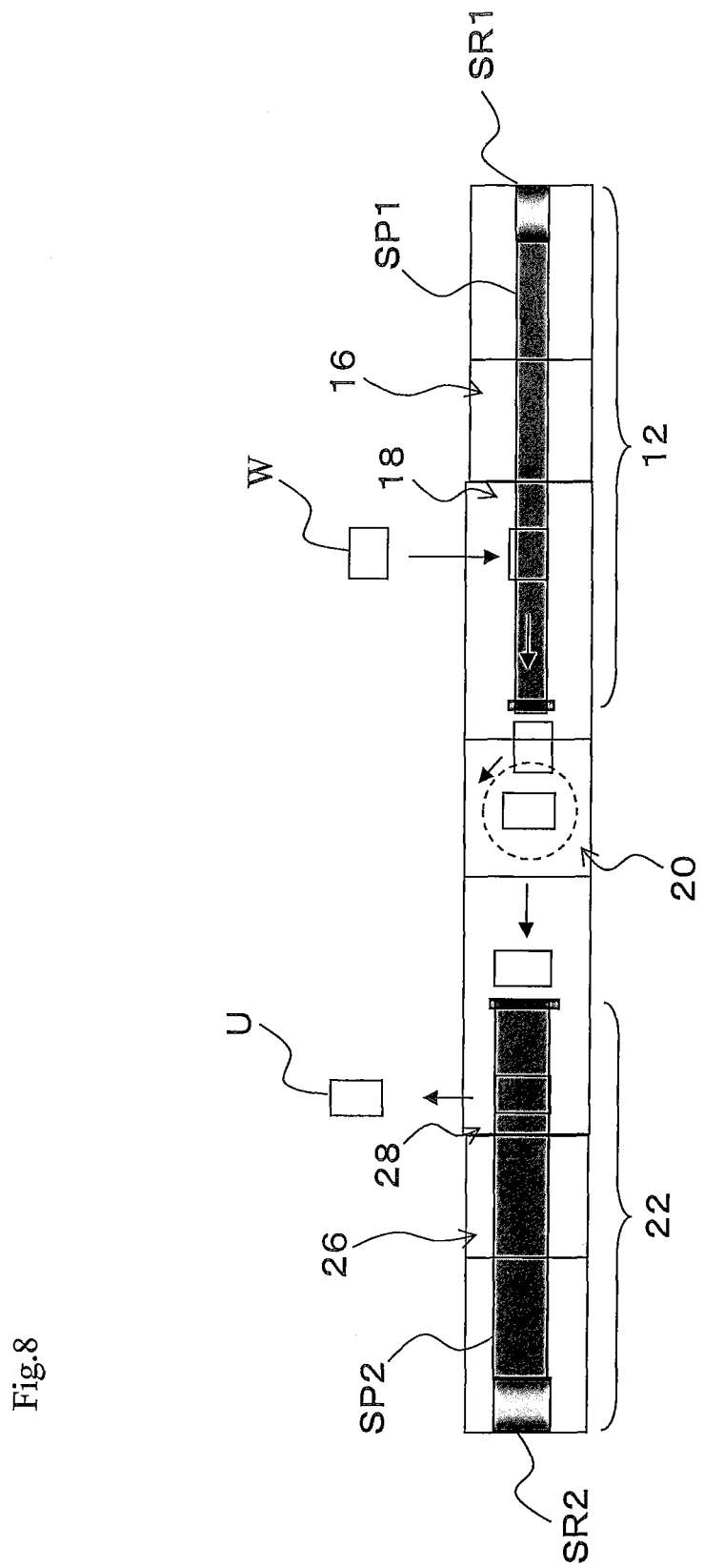
FIG. 8 is a schematic plan view showing an example of the system for manufacturing an optical display unit.
Figure 9:
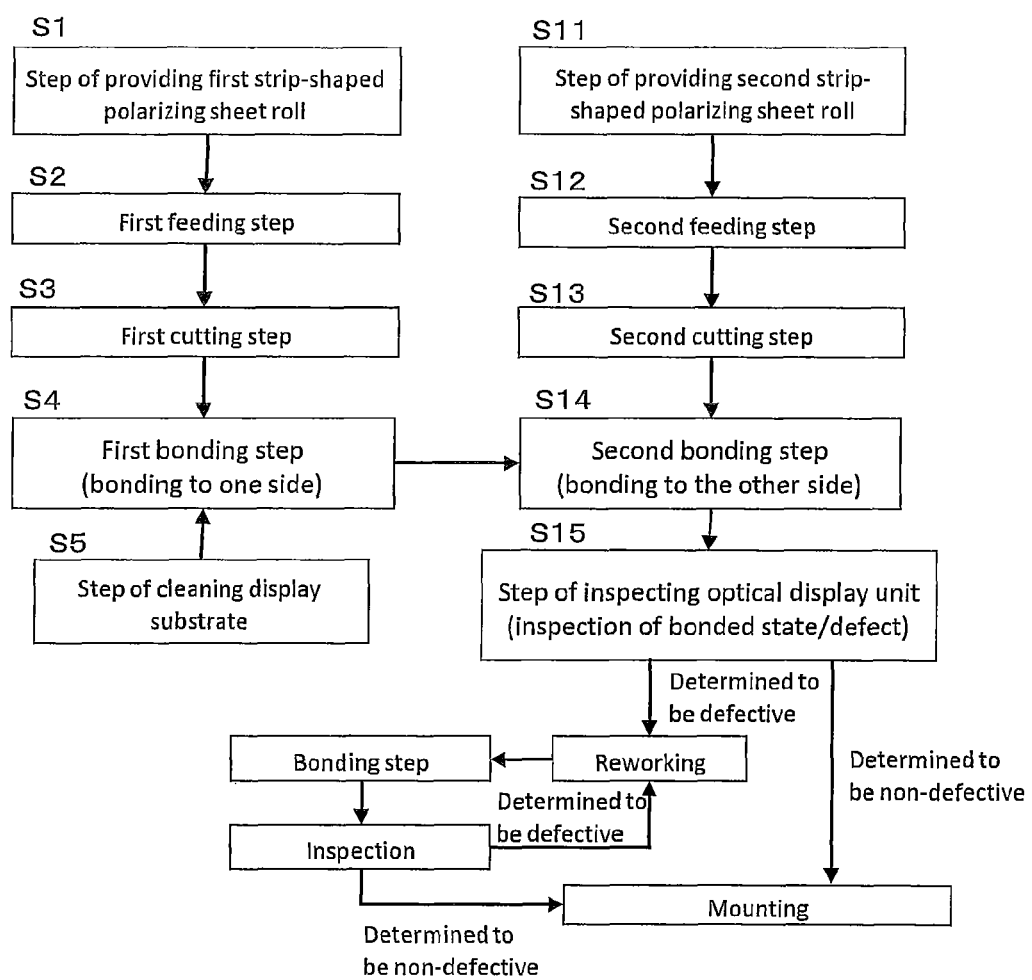
FIG. 9 is a flow chart showing an example of the method for manufacturing an optical display unit.
Figure 10:
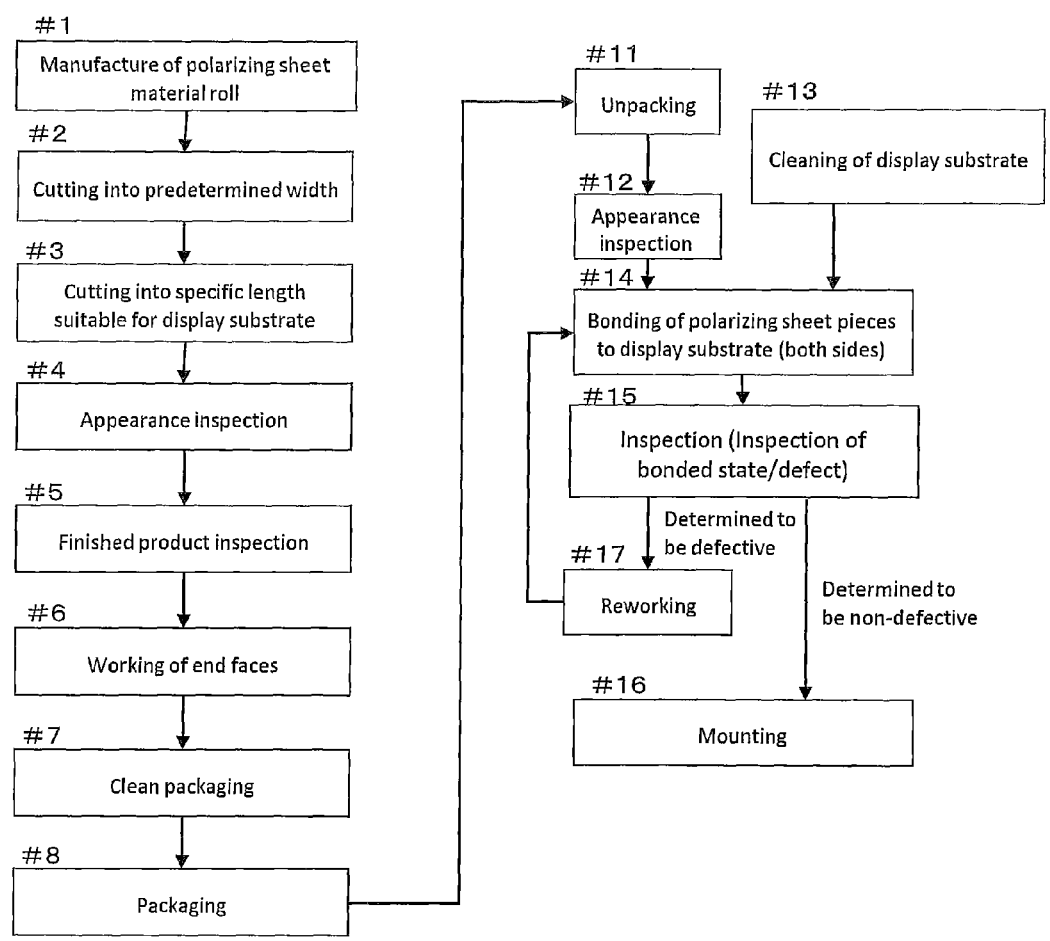
FIG. 10 is a flow chart showing a typical conventional method for manufacturing an optical display unit to be incorporated into an optical display device.

FIG. 8 is a schematic plan view showing an example of the system for manufacturing an optical display unit U. FIG. 9 is a flow chart showing an example of the method for manufacturing an optical display unit U.

(1) A first strip-shaped polarizing sheet roll SR1 is provided, which is a roll of a laminate including: a first strip-shaped polarizing sheet SP1 having a first pressure-sensitive adhesive layer F14 and having undergone cutting (slitting) into a width corresponding to the short side of a display substrate W; and a first release film F12 bonded to the first pressure-sensitive adhesive layer F14 (Step S1: the step of providing a first strip-shaped polarizing sheet roll).

(2) The provided first strip-shaped polarizing sheet roll SR1 is set so that it can rotate around its axis, and a first feeder 12 draws and feeds the first strip-shaped polarizing sheet SP1 from the first strip-shaped polarizing sheet roll SR1 (Step S2: the first feeding step). The first strip-shaped polarizing sheet SP1 drawn from the first strip-shaped polarizing sheet roll SR1 is fed to the position where it is bonded to the display substrate W, while the first release film F12 is bonded to it. The first feeder 12 includes plural feed rollers (not shown) for feeding the first strip-shaped polarizing sheet SP1 and is provided to transfer it from the first strip-shaped polarizing sheet roll SR1 to a first bonding apparatus 18 as described below.

(3) The first strip-shaped polarizing sheet SP1 being fed by the first feeder 12 is cut at specific intervals by a first cutting apparatus 16, so that a first polarizing sheet piece F1 is formed (Step S3: the first cutting step). In this step, only the first strip-shaped polarizing sheet SP1 is cut, while the first release film F12 bonded to the first strip-shaped polarizing sheet SP1 is left uncut, so that the resulting first polarizing sheet piece F1 is transported on the first release film F12 serving as a carrier. However, this feature is non-limiting, and alternatively, the first strip-shaped polarizing sheet SP1 may be cut together with the first release film F12.

For example, the first cutting apparatus 16 includes a laser or a cutter and cuts the first strip-shaped polarizing sheet SP1 along its width direction. In this embodiment, the defect position information, which is previously detected in the cutting information determination method as described above, is supplied to the optical display unit manufacturing system, and the first strip-shaped polarizing sheet SP1 is cut based on the defect position information.

Specifically, the system is configured so that if it is expected that cutting the first strip-shaped polarizing sheet SP1 at regular intervals will cause the resulting first polarizing sheet piece F1 to have a defect(s), the cutting position will be shifted so that the defect(s) can be avoided. Therefore, the first polarizing sheet piece F1 obtained by cutting at intervals corresponding to the long side of the display substrate W is defect-free, and only the defect-free first polarizing sheet piece F1 is successfully bonded to the display substrate W. Therefore, when the first strip-shaped polarizing sheet SP1 is cut at intervals based on the defect position information previously detected as described above, defect-free first polarizing sheet pieces F1 can be efficiently produced and bonded to display substrates W, respectively, so that the yield of optical display units U can be improved.

(4) The first polarizing sheet piece F1 produced by cutting the first strip-shaped polarizing sheet SP1 is bonded to a first surface of the display substrate W by a first bonding apparatus 18 (Step S4: the first bonding step). In this bonding step, the first release film F12 is peeled off from the first polarizing sheet piece F1, and while the first pressure-sensitive adhesive layer F14 of the first polarizing sheet piece F1 is opposed to the first surface of the display substrate W, the first polarizing sheet piece F1 and the display substrate W are press-bonded together between a pair of rollers (not shown). Before the first polarizing sheet piece F1 is bonded, the surface of the display substrate W is cleaned by polishing cleaning, washing with water, or any other cleaning method (Step S5: the display substrate cleaning step).

The first feeding step, the first cutting step, and the first bonding step described above are performed on a continuous production line. After the first polarizing sheet piece F1 is bonded to the display substrate W by a series of these steps, a second polarizing sheet piece F2, which is cut from a second strip-shaped polarizing sheet roll SR2, is bonded to the display substrate W by the steps described below.

(5) A second strip-shaped polarizing sheet roll SR2 is provided, which is a roll of a laminate including: a second strip-shaped polarizing sheet SP2 having a second pressure-sensitive adhesive layer F24 and having undergone cutting (slitting) into a width corresponding to the long side of the display substrate W; and a second release film F22 bonded to the second pressure-sensitive adhesive layer F24 (Step S11: the step of providing a second strip-shaped polarizing sheet roll). When the display substrate W has a rectangular shape as in this embodiment, the second strip-shaped polarizing sheet roll SR2 has undergone slitting into a width different from that of the first strip-shaped polarizing sheet roll SR1.

(6) The provided second strip-shaped polarizing sheet roll SR2 is set so that it can rotate around its axis, and a second feeder 22 draws and feeds the second strip-shaped polarizing sheet SP2 from the second strip-shaped polarizing sheet roll SR2 (Step S12: the second feeding step). The second strip-shaped polarizing sheet SP2 drawn from the second strip-shaped polarizing sheet roll SR2 is fed to the position where it is bonded to the display substrate W, while the second release film F22 is bonded to it. The second feeder 22 includes plural feed rollers (not shown) for feeding the second strip-shaped polarizing sheet SP2 and is provided to transfer it from the second strip-shaped polarizing sheet roll SR2 to a second bonding apparatus 28 as described below.

(7) The second strip-shaped polarizing sheet SP2 being fed by the second feeder 22 is cut at specific intervals by a second cutting apparatus 26, so that a second polarizing sheet piece F2 is formed (Step S13: the second cutting step). In this step, only the second strip-shaped polarizing sheet SP2 is cut, while the second release film F22 bonded to the second strip-shaped polarizing sheet SP2 is left uncut, so that the resulting second polarizing sheet piece F2 is transported on the second release film F22 serving as a carrier. However, this feature is non-limiting, and alternatively, the second strip-shaped polarizing sheet SP2 may be cut together with the second release film F22.

The second cutting apparatus 26 is configured to cut the second strip-shaped polarizing sheet SP2 based on the defect position information, which is previously detected in the cutting information determination method as described above. It has the same configuration as the first cutting apparatus 16, and therefore, a detailed description thereof is omitted here.

(8) The second polarizing sheet piece F2 produced by cutting the second strip-shaped polarizing sheet SP2 is bonded to a second surface of the display substrate W by a second bonding apparatus 28 (Step S14: the second bonding step). The second bonding apparatus 28 performs the bonding in the same manner as the first bonding apparatus 18 does. Before the bonding of the second polarizing sheet piece F2, the display substrate W with the first surface bonded to the first polarizing sheet piece F1 is horizontally turned by 90° by a turning apparatus 20. Therefore, the first and second polarizing sheet pieces F1 and F2 bonded to the display substrate W are in such a state that their polarization axes are perpendicular to each other (so-called the crossed-Nicols relationship). However, the rotation of the display substrate W by 90° is non-limiting, and alternatively, the system may be configured so that the first strip-shaped polarizing sheet SP1 and the second strip-shaped polarizing sheet SP2 can be fed in directions perpendicular to each other, which also makes possible the crossed-Nicols relationship between the first and second polarizing sheet pieces F1 and F2 bonded to the display substrate W.

(9) The optical display unit U produced by bonding the first and second polarizing sheet pieces F1 and F2 is inspected by an inspection apparatus (not shown) (Step S15: the step of inspecting an optical display unit). The inspection method may be a method of applying light to both sides of the optical display unit U so that an image can be taken and processed. Known techniques may be used for the image processing algorithm, and for example, defects may be detected using gray-scale determination based on binarization.

(10) The defect information detected by the inspection apparatus is used to determine whether the optical display unit U is non-defective. The optical display unit U determined to be non-defective is transferred to the next mounting process. On the other hand, when determined to be defective, it is subjected to a reworking process, in which the first and second polarizing sheet pieces F1 and F2 are re-bonded in the manner described above, and the reworking process is repeated until the product is determined to be non-defective.

The optical display unit U manufactured according to the above embodiment may be incorporated into an optical display device such as a liquid crystal display device, an organic EL display device, or a plasma display panel (PDP).

DESCRIPTION OF REFERENCE CHARACTERS

In the drawings, reference character 100 represents a cutting information determination apparatus, 101 a defect detection unit, 102 a defect counting unit, 103 a candidate extraction unit, 104 a yield calculation unit, 105 a cutting information determination unit, 106 a defect information storage unit, 200 a cutting apparatus, SR1 a first strip-shaped polarizing sheet roll, SP1 a first strip-shaped polarizing sheet, F1 a first polarizing sheet piece, SR2 a second strip-shaped polarizing sheet roll, SP2 a second strip-shaped polarizing sheet, and F2 a second polarizing sheet piece.

The invention claimed is:

1. A strip-shaped polarizing sheet, comprising a product manufactured by a method for manufacturing a strip-shaped polarizing sheet and having information about the positions of defects,
    wherein the method for manufacturing the strip-shaped polarizing sheet comprises cutting a polarizing sheet material along its longitudinal direction based on cutting information determined by a cutting information determination method,
    wherein the cutting information determination method for determining information about how to cut a polarizer-containing long polarizing sheet material along its longitudinal direction so that a long strip-shaped polarizing sheet with a predetermined cut width can be produced, comprises:
    a defect detecting step of detecting information about the positions of defects in the polarizing sheet material;
    a defect counting step of counting defects present in the longitudinal direction with respect to each of a plurality of points in a width direction perpendicular to the longitudinal direction, based on the information about the positions of the detected defects; and
    a cutting position determining step of determining a cutting position in the width direction from the cutting position of areas, for each of which the number of defects within an area defined by the cutting position and the predetermined cut width is less than a predetermined number, in which the polarizing sheet material is to be cut along the longitudinal direction, based on the counted numbers of defects with respect to the plurality of points.

2. The strip-shaped polarizing sheet, according to claim 1, wherein the strip-shaped polarizing sheet is formed by cutting the polarizing sheet material into a predetermined width and is for use in forming a plurality of rectangular polarizing sheet pieces of a predetermined size by being cut into a predetermined length along the longitudinal direction, the cutting information determination method further comprising a candidate extracting step of extracting a plurality of candidates for the cutting position, based on the counted numbers of defects with respect to the plurality of points, wherein in the cutting position determining step, the cutting position is determined from the plurality of extracted candidates for the cutting position, based on the information about the positions of defects present in the longitudinal direction within the cut width with respect to each cutting position candidate.

3. The strip-shaped polarizing sheet according to claim 2, the cutting information determination method further comprising a yield calculating step of calculating the yield of polarizing sheet pieces of a predetermined size, which can be obtained by cutting the polarizing sheet material at each cutting position candidate, based on the information about the positions of defects present in the longitudinal direction within the cut width with respect to each of the plurality of extracted candidates for the cutting position, wherein in the cutting position determining step, the cutting position is determined based on the calculated yield.

4. A strip-shaped polarizing sheet, comprising a product manufactured by a method for manufacturing a strip-shaped polarizing sheet and having the information about the positions of defects, wherein the method for manufacturing the strip-shaped polarizing sheet comprises cutting a polarizing sheet material along its longitudinal direction based on cutting information determined by a cutting information determination method, wherein the cutting information determination method for determining information about how to cut a polarizer-containing long polarizing sheet material along its longitudinal direction so that a long strip-shaped polarizing sheet with a predetermined cut width can be produced, comprises:

a defect detecting step of detecting information about the positions of defects in the polarizing sheet material;

a defect counting step of counting defects present in the longitudinal direction with respect to each of a plurality of points in a width direction perpendicular to the longitudinal direction, based on the information about the positions of the detected defects; and a cut width determining step of determining a width from the width areas, for each of which the number of defects within an area defined by the predetermined cutting position and the predetermined cut width is less than a predetermined number, into which the polarizing sheet material is to be cut along the longitudinal direction, based on the counted numbers of defects with respect to the plurality of points.

5. The strip-shaped polarizing sheet according to claim 4, wherein the strip-shaped polarizing sheet is formed by cutting the polarizing sheet material into any desired width at a predetermined cutting position and is for use in forming a plurality of rectangular polarizing sheet pieces of any desired size by being cut into a predetermined length along the longitudinal direction, the cutting information determination method further comprising a candidate extracting step of extracting a plurality of candidates for the cut width, based on the counted numbers of defects with respect to the plurality of points, wherein in the cutting position determining step, the cut width is determined from the plurality of extracted candidates for the cut width, based on the information about the positions of defects present in the longitudinal direction within each cut width candidate with respect to the predetermined cutting position.

6. The strip-shaped polarizing sheet according to claim 5, the cutting information determination method further comprising a yield calculating step of calculating the yield of polarizing sheet pieces of each size, which can be obtained by cutting the polarizing sheet material into each width, based on the information about the positions of defects present in the longitudinal direction within each of the plurality of extracted candidates for the cut width with respect to the predetermined cutting position, wherein in the cutting position determining step, the cut width is determined based on the calculated yield and a coefficient for each size of the polarizing sheet piece.

7. A strip-shaped polarizing sheet, comprising a product manufactured by a method for manufacturing a strip-shaped polarizing sheet and having the information about the positions of defects, wherein the method for manufacturing the strip-shaped polarizing sheet comprises cutting a polarizing sheet material along its longitudinal direction based on cutting information determined by a cutting information determination method, wherein the cutting information determination method for determining information about how to cut a polarizer-containing long polarizing sheet material along its longitudinal direction so that a long strip-shaped polarizing sheet with a predetermined cut width can be produced, comprises:

a defect detecting step of detecting information about the positions of defects in the polarizing sheet material;

a defect counting step of counting defects present in the longitudinal direction with respect to each of a plurality of points in a width direction perpendicular to the longitudinal direction, based on the information about the positions of the detected defects; and a cutting information determining step of determining a cutting position in the width direction and a width from the cutting position and the width of areas, for each of which the number of defects within an area defined by a combination of each predetermined cutting position and each predetermined cut width is less than a predetermined number, in which and into which the polarizing sheet material is to be cut along the longitudinal direction, based on the counted numbers of defects with respect to the plurality of points.

8. The strip-shaped polarizing sheet according to claim 7, wherein the strip-shaped polarizing sheet is formed by cutting the polarizing sheet material into any desired width at any desired cutting position and is for use in forming a plurality of rectangular polarizing sheet pieces of any desired size by being cut it into a predetermined length along the longitudinal direction, the cutting information determination method further comprising a candidate extracting step of extracting a plurality of combination candidates for a combination of the cutting position and the cut width, based on the counted numbers of defects with respect to the plurality of points, wherein in the cutting information determining step, the cutting position and the cut width are determined from the plurality of extracted combination candidates, based on the information about the positions of defects present in the longitudinal direction within the cut width candidate with respect to the cutting position candidate corresponding to the cut width candidate.

9. The strip-shaped polarizing sheet according to claim 8, the cutting information determination method further comprising a yield calculating step of calculating the yield of polarizing sheet pieces of each size, which can be obtained by cutting the polarizing sheet material with each combination, based on the information about the positions of defects present in the longitudinal direction within the cut width for the cutting position corresponding to the plurality of extracted combination candidates,
wherein in the cutting position determining step, the cutting position and the cut width are determined based on the calculated yield and a coefficient for each size of the polarizing sheet piece.

10. A polarizing sheet material, having cutting information determined by a cutting information determination method for determining information about how to cut a polarizer-containing long polarizing sheet material along its longitudinal direction so that a long strip-shaped polarizing sheet with a predetermined cut width can be produced, comprising:
a defect detecting step of detecting information about the positions of defects in the polarizing sheet material;
a defect counting step of counting defects present in the longitudinal direction with respect to each of a plurality of points in a width direction perpendicular to the longitudinal direction, based on the information about the positions of the detected defects; and
a cutting position determining step of determining a cutting position in the width direction from the cutting position of areas, for each of which the number of defects within an area defined by the cutting position and the predetermined cut width is less than a predetermined number, in which the polarizing sheet material is to be cut along the longitudinal direction, based on the counted numbers of defects with respect to the plurality of points.

11. The polarizing sheet material according to claim 10, wherein the strip-shaped polarizing sheet is formed by cutting the polarizing sheet material into a predetermined width and is for use in forming a plurality of rectangular polarizing sheet pieces of a predetermined size by being cut into a predetermined length along the longitudinal direction,
the cutting information determination method further comprising a candidate extracting step of extracting a plurality of candidates for the cutting position, based on the counted numbers of defects with respect to the plurality of points,
wherein in the cutting position determining step, the cutting position is determined from the plurality of extracted candidates for the cutting position, based on the information about the positions of defects present in the longitudinal direction within the cut width with respect to each cutting position candidate.

12. The polarizing sheet material according to claim 10, cutting information determination method further comprising a yield calculating step of calculating the yield of polarizing sheet pieces of a predetermined size, which can be obtained by cutting the polarizing sheet material at each cutting position candidate, based on the information about the positions of defects present in the longitudinal direction within the cut width with respect to each of the plurality of extracted candidates for the cutting position,
wherein in the cutting position determining step, the cutting position is determined based on the calculated yield.

13. A polarizing sheet material, having cutting information determined by a cutting information determination method for determining information about how to cut a polarizer-containing long polarizing sheet material along its longitudinal direction so that a long strip-shaped polarizing sheet with a predetermined cut width can be produced, comprising:
a defect detecting step of detecting information about the positions of defects in the polarizing sheet material;
a defect counting step of counting defects present in the longitudinal direction with respect to each of a plurality of points in a width direction perpendicular to the longitudinal direction, based on the information about the positions of the detected defects; and
a cut width determining step of determining a width from the width areas, for each of which the number of defects within an area defined by the predetermined cutting position and the predetermined cut width is less than a predetermined number, into which the polarizing sheet material is to be cut along the longitudinal direction, based on the counted numbers of defects with respect to the plurality of points.

14. The polarizing sheet material according to claim 13, wherein the strip-shaped polarizing sheet is formed by cutting the polarizing sheet material into any desired width at a predetermined cutting position and is for use in forming a plurality of rectangular polarizing sheet pieces of any desired size by being cut into a predetermined length along the longitudinal direction,
the cutting information determination method further comprising a candidate extracting step of extracting a plurality of candidates for the cut width, based on the counted numbers of defects with respect to the plurality of points,
wherein in the cutting position determining step, the cut width is determined from the plurality of extracted candidates for the cut width, based on the information about the positions of defects present in the longitudinal direction within each cut width candidate with respect to the predetermined cutting position.

15. The polarizing sheet material to claim 14, the cutting information determination method further comprising a yield calculating step of calculating the yield of polarizing sheet pieces of each size, which can be obtained by cutting the polarizing sheet material into each width, based on the information about the positions of defects present in the longitudinal direction within each of the plurality of extracted candidates for the cut width with respect to the predetermined cutting position,
wherein in the cutting position determining step, the cut width is determined based on the calculated yield and a coefficient for each size of the polarizing sheet piece.

16. A polarizing sheet material, having cutting information determined by a cutting information determination method for determining information about how to cut a polarizer-containing long polarizing sheet material along its longitudinal direction so that a long strip-shaped polarizing sheet with a predetermined cut width can be produced, comprising:
a defect detecting step of detecting information about the positions of defects in the polarizing sheet material;

a defect counting step of counting defects present in the longitudinal direction with respect to each of a plurality of points in a width direction perpendicular to the longitudinal direction, based on the information about the positions of the detected defects; and a cutting information determining step of determining a cutting position in the width direction and a width from the cutting position and the width of areas, for each of which the number of defects within an area defined by a combination of each predetermined cutting position and each predetermined cut width is less than a predetermined number, in which and into which the polarizing sheet material is to be cut along the longitudinal direction, based on the counted numbers of defects with respect to the plurality of points.

17. The polarizing sheet material according to claim 16, wherein the strip-shaped polarizing sheet is formed by cutting the polarizing sheet material into any desired width at any desired cutting position and is for use in forming a plurality of rectangular polarizing sheet pieces of any desired size by being cut it into a predetermined length along the longitudinal direction, the cutting information determination method further comprising a candidate extracting step of extracting a plurality of combination candidates for a combination of the cutting position and the cut width, based on the counted numbers of defects with respect to the plurality of points, wherein in the cutting information determining step, the cutting position and the cut width are determined from the plurality of extracted combination candidates, based on the information about the positions of defects present in the longitudinal direction within the cut width candidate with respect to the cutting position candidate corresponding to the cut width candidate.

18. The polarizing sheet material according to claim 17, the cutting information determination method further comprising a yield calculating step of calculating the yield of polarizing sheet pieces of each size, which can be obtained by cutting the polarizing sheet material with each combination, based on the information about the positions of defects present in the longitudinal direction within the cut width for the cutting position corresponding to the plurality of extracted combination candidates, wherein in the cutting position determining step, the cutting position and the cut width are determined based on the calculated yield and a coefficient for each size of the polarizing sheet piece.

\* \* \* \* \*